(12) United States Patent
Sade et al.

(10) Patent No.: US 11,023,382 B2
(45) Date of Patent: Jun. 1, 2021

(54) SYSTEMS, METHODS, AND APPARATUSES UTILIZING CPU STORAGE WITH A MEMORY REFERENCE

(71) Applicant: Intel Corporation, Santa Clara, CA (US)

(72) Inventors: Raanan Sade, Kibutz Sarid (IL); Jason Brandt, Austin, TX (US); Mark J. Charney, Lexington, MA (US); Joseph Nuzman, Haifa (IL); Leena Puthiyedath, Portland, OR (US); Rinat Rappoport, Haifa (IL); Vivekananthan Sanjeepan, Portland, OR (US); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 15/853,640

(22) Filed: Dec. 22, 2017

(65) Prior Publication Data
US 2019/0042448 A1 Feb. 7, 2019

(51) Int. Cl.
| | | |
|---|---|---|
| G06F 12/0877 | (2016.01) | |
| G06F 12/0846 | (2016.01) | |
| G06F 12/0895 | (2016.01) | |
| G06F 12/0813 | (2016.01) | |
| G06F 12/0804 | (2016.01) | |
| G06F 12/0875 | (2016.01) | |
| G06F 12/02 | (2006.01) | |
| G06F 9/30 | (2018.01) | |
| G06T 1/60 | (2006.01) | |

(52) U.S. Cl.
CPC ........ *G06F 12/0877* (2013.01); *G06F 9/3012* (2013.01); *G06F 12/0207* (2013.01); *G06F 12/0804* (2013.01); *G06F 12/0813* (2013.01); *G06F 12/0846* (2013.01); *G06F 12/0875* (2013.01); *G06F 12/0895* (2013.01); *G06T 1/60* (2013.01); *G06F 2212/1024* (2013.01); *G06F 2212/452* (2013.01); *G06F 2212/454* (2013.01)

(58) Field of Classification Search
CPC ............. G06F 12/0877; G06F 12/0813; G06F 12/0895; G06F 12/0846; G06F 9/3012; G06F 12/0207; G06F 12/0875; G06F 12/0804; G06F 2212/1024; G06F 2212/454; G06F 2212/452; G06F 9/30047; G06F 9/461; G06F 9/30138; G06F 9/30123; G06F 9/3851; G06T 1/60
USPC ................................ 711/118, 125, 144, 170
See application file for complete search history.

(56) References Cited

U.S. PATENT DOCUMENTS

| | | | | |
|---|---|---|---|---|
| 8,688,962 B2* | 4/2014 | Raikin | ................ | G06F 12/0815 712/225 |
| 2005/0138297 A1* | 6/2005 | Sodani | ................ | G06F 9/30138 711/143 |

(Continued)

*Primary Examiner* — Hong C Kim
(74) *Attorney, Agent, or Firm* — Nicholson De Vos Webster & Elliott, LLP

(57) ABSTRACT

Implementations of using tiles for caching are detailed In some implementations, an instruction execution circuitry executes one or more instructions, a register state cache coupled to the instruction execution circuitry holds thread register state in a plurality of registers, and backing storage pointer storage stores a backing storage pointer, wherein the backing storage pointer is to reference a state backing storage area in external memory to store the thread register state stored in the register state cache.

9 Claims, 29 Drawing Sheets

(56) References Cited

U.S. PATENT DOCUMENTS

| | | | |
|---|---|---|---|
| 2012/0047344 A1* | 2/2012 | Sheaffer | G06F 9/30032 |
| | | | 711/165 |
| 2012/0254542 A1* | 10/2012 | Raikin | G06F 12/0804 |
| | | | 711/125 |
| 2013/0198487 A1* | 8/2013 | Pusdesris | G06F 9/30156 |
| | | | 712/11 |
| 2016/0246728 A1* | 8/2016 | Ron | G06F 9/30098 |

* cited by examiner

| PALETTE ID 1201 | 0 |
| --- | --- |
| 0 | 0 |
| 0 | 0 |
| 0 | 0 |
| STARTM 1203 ||
| STARTK 1205 ||
| 0 | 0 |
| TMM0 ROWS 1213 | TMM0 COLUMNS 1215 |
| TMM1 ROWS | TMM1 COLUMNS |
| • • • ||
| TMM15 ROWS | TMM15 COLUMNS |
| 0 ||

FIG. 12

FIG. 16
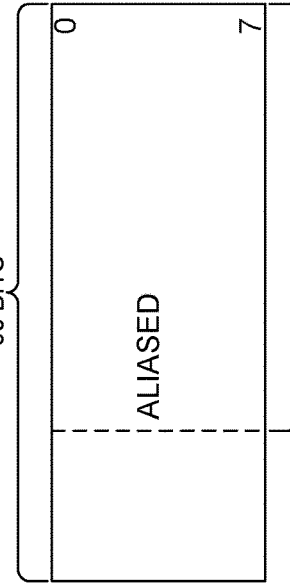
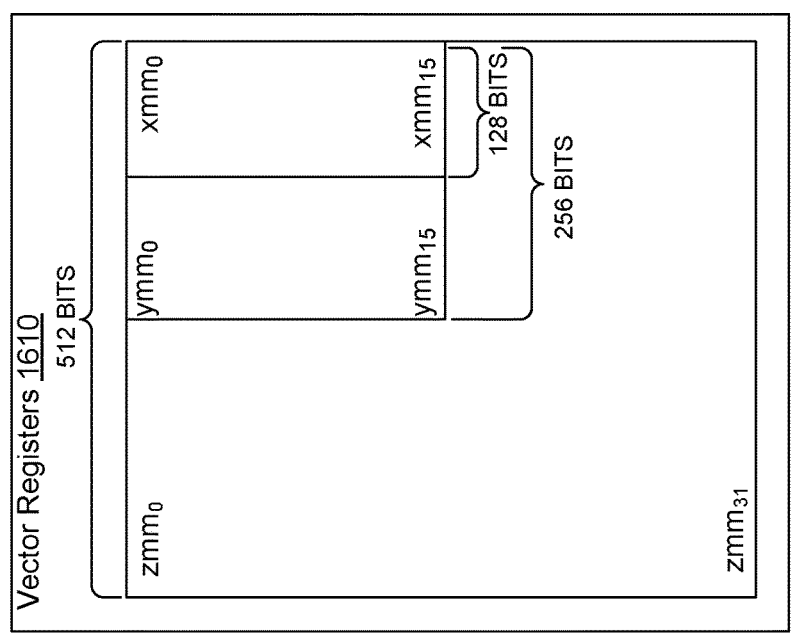

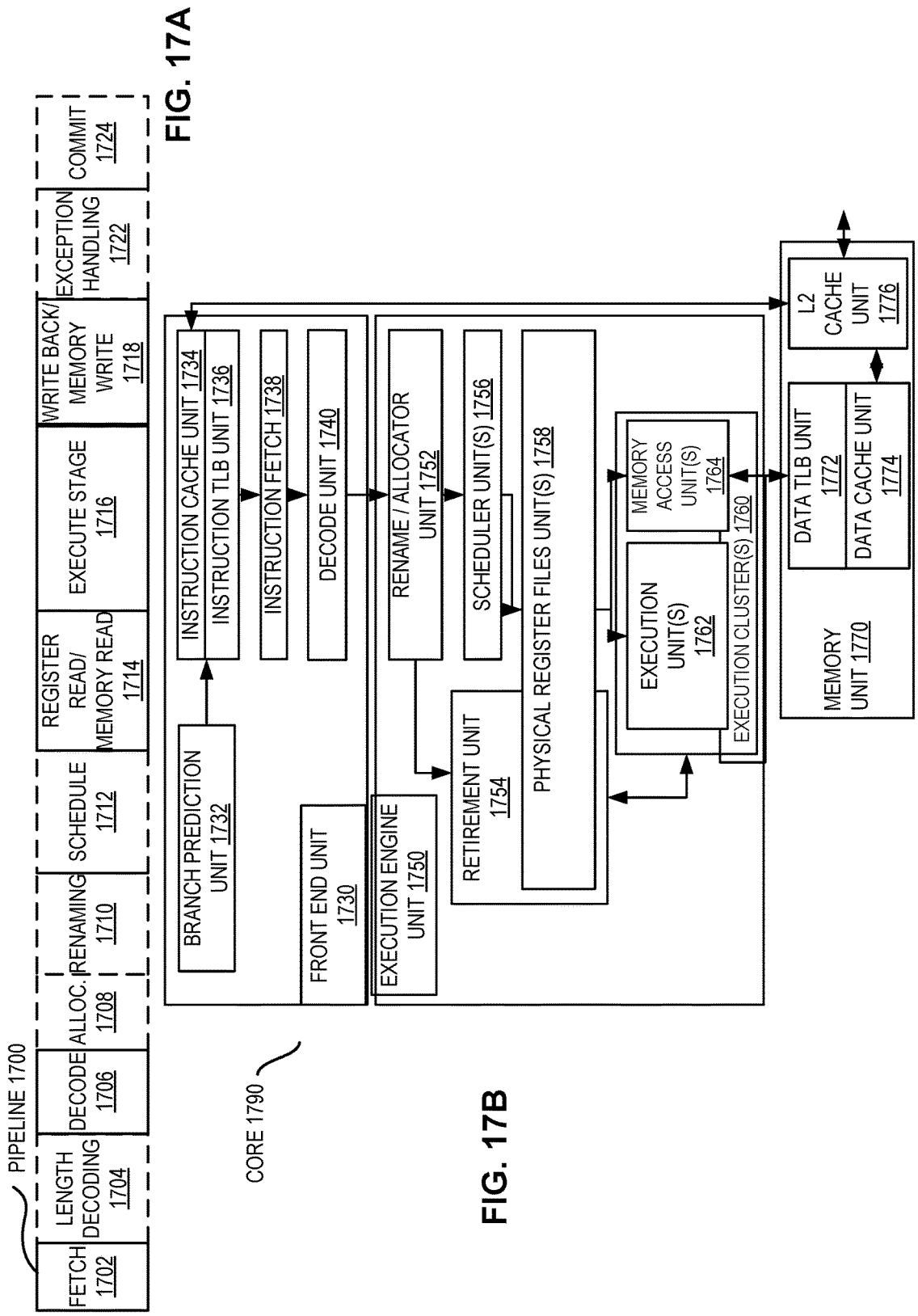

US 11,023,382 B2

SYSTEMS, METHODS, AND APPARATUSES UTILIZING CPU STORAGE WITH A MEMORY REFERENCE

FIELD OF INVENTION

The field of invention relates generally to computer processor architecture, and, more specifically, to using a backing storage.

BACKGROUND

Processor (e.g., central processor unit, graphics processor unit, accelerator, etc.) registers are saved and restored by an operating system (OS) for many reasons including, but not limited to: a context switch, an exception, etc. The memory allocated for saving/restoring register states is generally allocated in non-paged memory for each software thread.

BRIEF DESCRIPTION OF THE DRAWINGS

The present invention is illustrated by way of example and not limitation in the figures of the accompanying drawings, in which like references indicate similar elements and in which:

FIG. 12 illustrates an embodiment of a description of the matrices (tiles) to be supported;

FIG. 16 is a block diagram of a register architecture 1600 according to one embodiment of the invention;

FIG. 17A is a block diagram illustrating both an exemplary in-order pipeline and an exemplary register renaming, out-of-order issue/execution pipeline according to embodiments of the invention;

FIG. 17B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
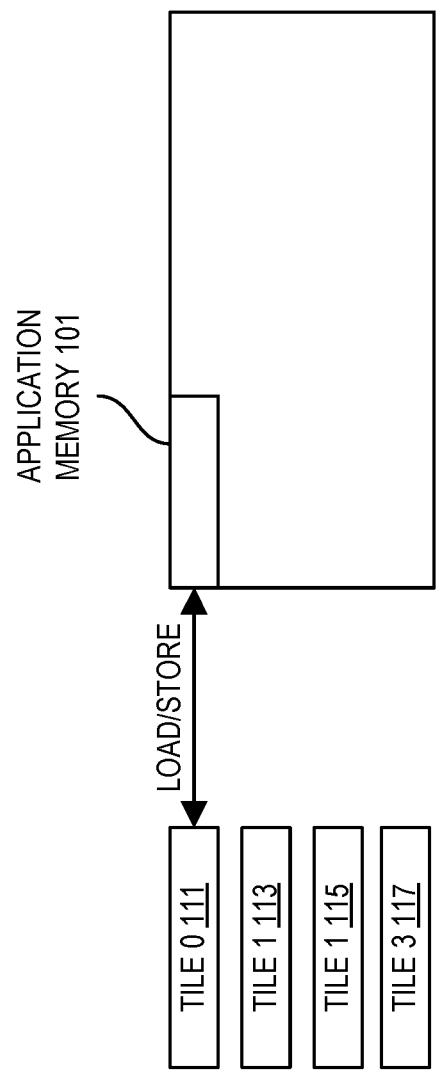
FIG. 1 illustrates an embodiment of configured tiles.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Register save/restore actions impact context switch latency and in some instances forces hardware state per supported logical threads to be added. Architectures that attempt adding a large register state (such as tiles detailed below) puts a huge stress on the operating system (OS) to increase the non-paged memory footprint.

Detailed herein are embodiments for associating a memory buffer with a logical register state. This is advantageous because it allows for the state allocation burden to be put on the application, or in a non-paged kernel space. This may reduce an impact of context switch latency and may use less physical register state than the architectural state.

In many mainstream processors, handling matrices is a difficult and/or instruction intensive task. For example, rows of a matrix could be put into a plurality of packed data (e.g., SIMD or vector) registers and then operated on individually. For example, an add two 8×2 matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (use less than all of a tile), or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transpose, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating point, double precision floating point, integer, etc.) may be supported.

FIG. 1 illustrates an embodiment of configured tiles. As shown, there are four tiles 111, 113, 115, and 117 that are loaded from application memory 101. In this example, tiles T0 111 and T1 113 have M rows and N columns with 4 element bytes (e.g., single precision data). Tiles T2 115 and T3 117 have M rows and N/2 columns with 8 element bytes (e.g., double precision data). As the double precision operands are twice the width of single precision, this configuration is consistent with a palette, used to provide tile options, supplying at least 4 names with total storage of 16*N*M bytes. Depending upon the instruction encoding scheme used, the number of tiles available varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row)

As such, an application can be written such that a fixed usage of names will be able to take advantage of different storage sizes across implementations.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

Figure 2:
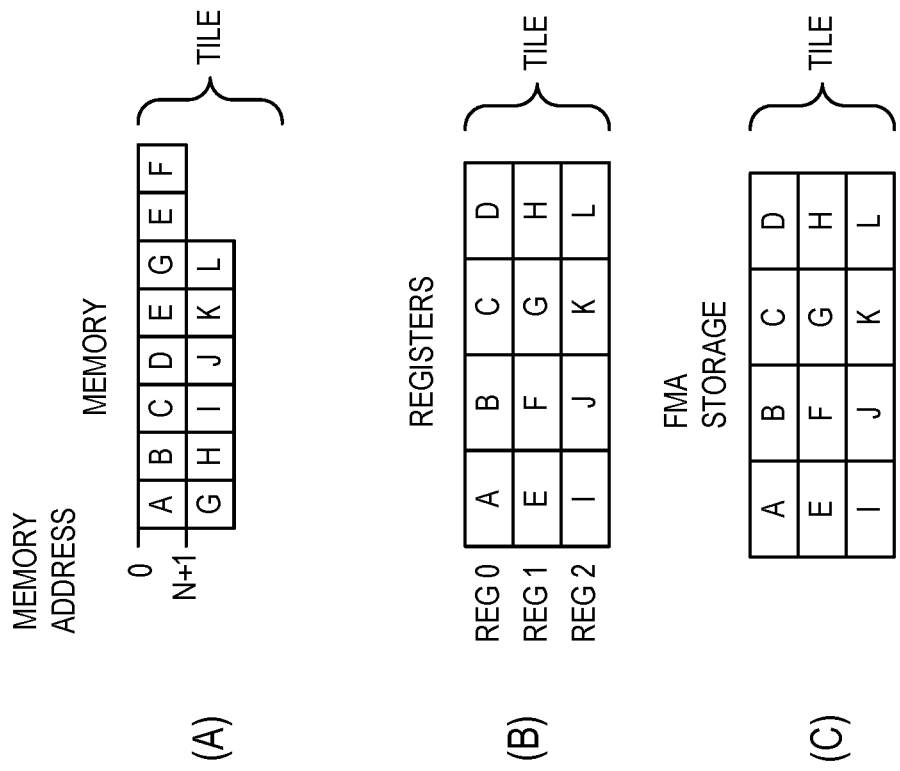
FIG. 2 illustrates several examples of matrix storage.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILESTORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiple accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIF metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64 byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64 byte rows, there would be 16 rows, so in this example, the last 6 rows would also be zeroed.

In some embodiments, a context restore (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating point exceptions, with the masking of the exceptions controlled by a control and/or status register.

To support restarting instructions after these events, the instructions store information in the start registers detailed below.

Figure 3:
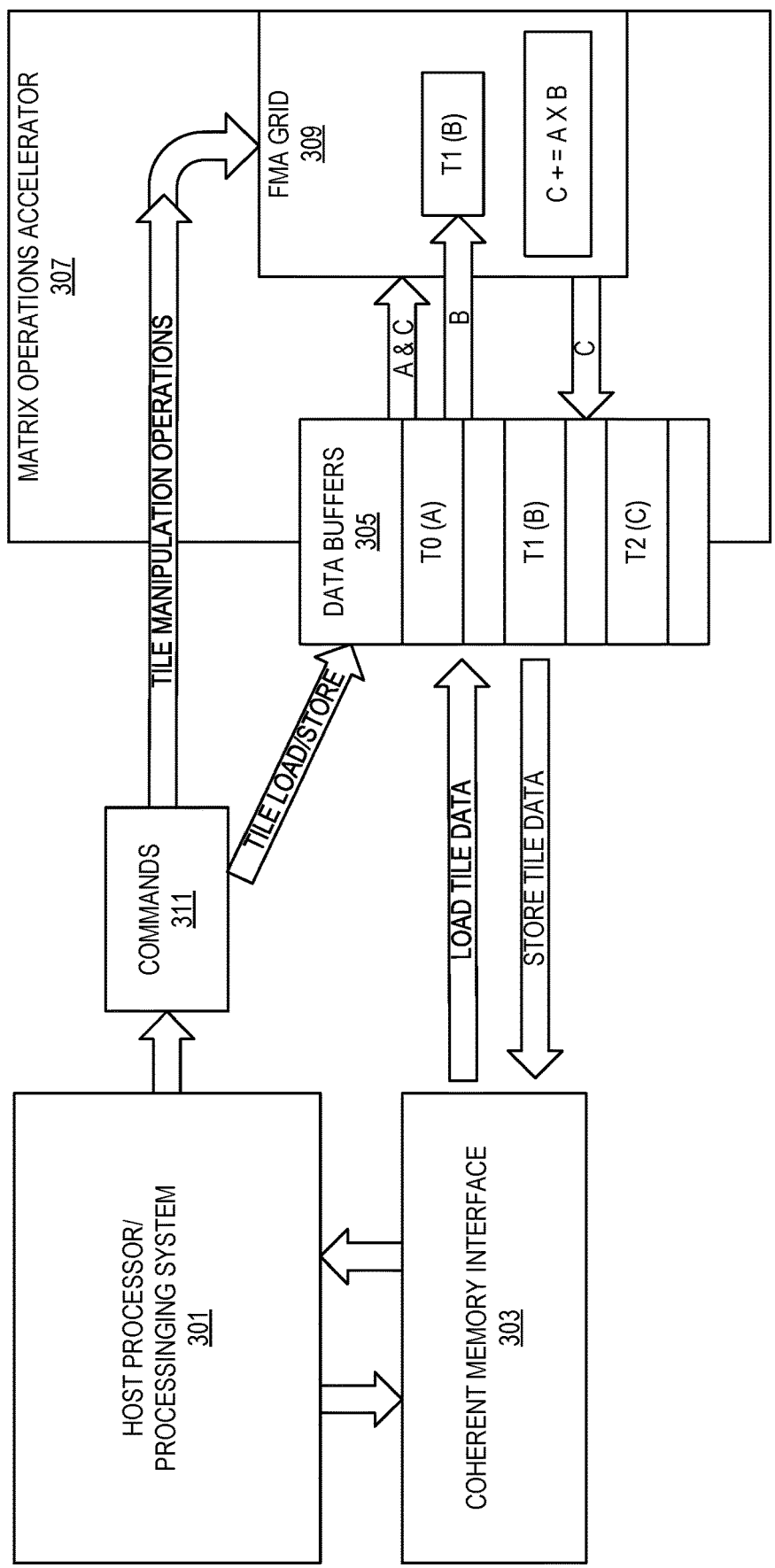
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
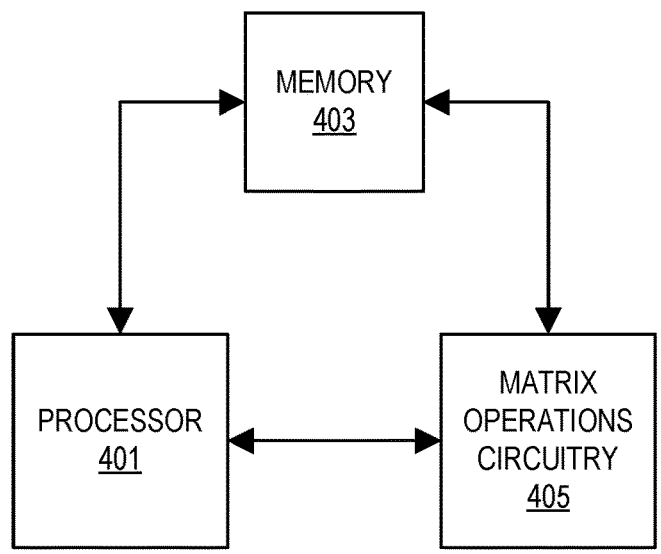
FIGS. 4 and 5 show different embodiments of how memory is shared using a matrix operations accelerator.
Figure 5:
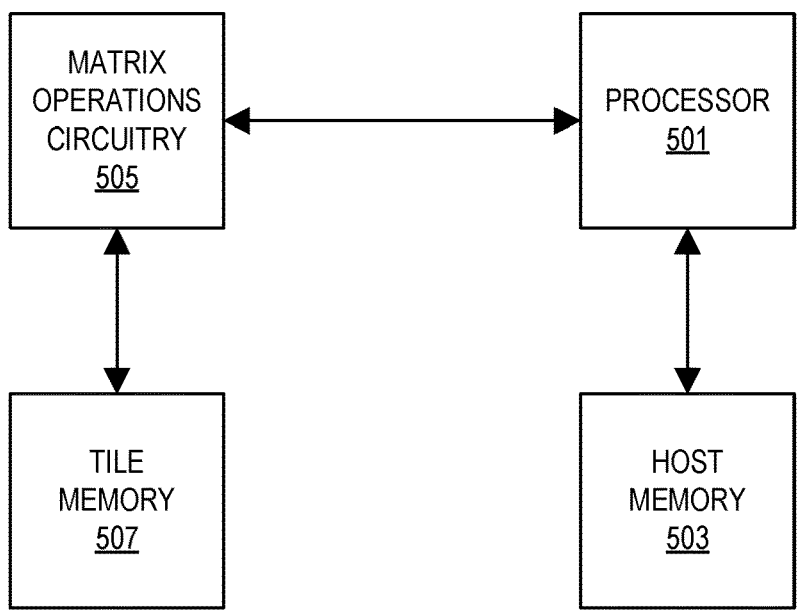

In this example, a coherent memory interface 303 is coupled to the host processor/processing system 301 and matrix operations accelerator 405 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory, but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

The matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset are stored in the FMA grid 309. As shown, T1 is housed and T0 and T2 are not. Note that A, B, and C refer to the matrices of these tiles which may or may not take up the entire space of the tile.

Figure 6:
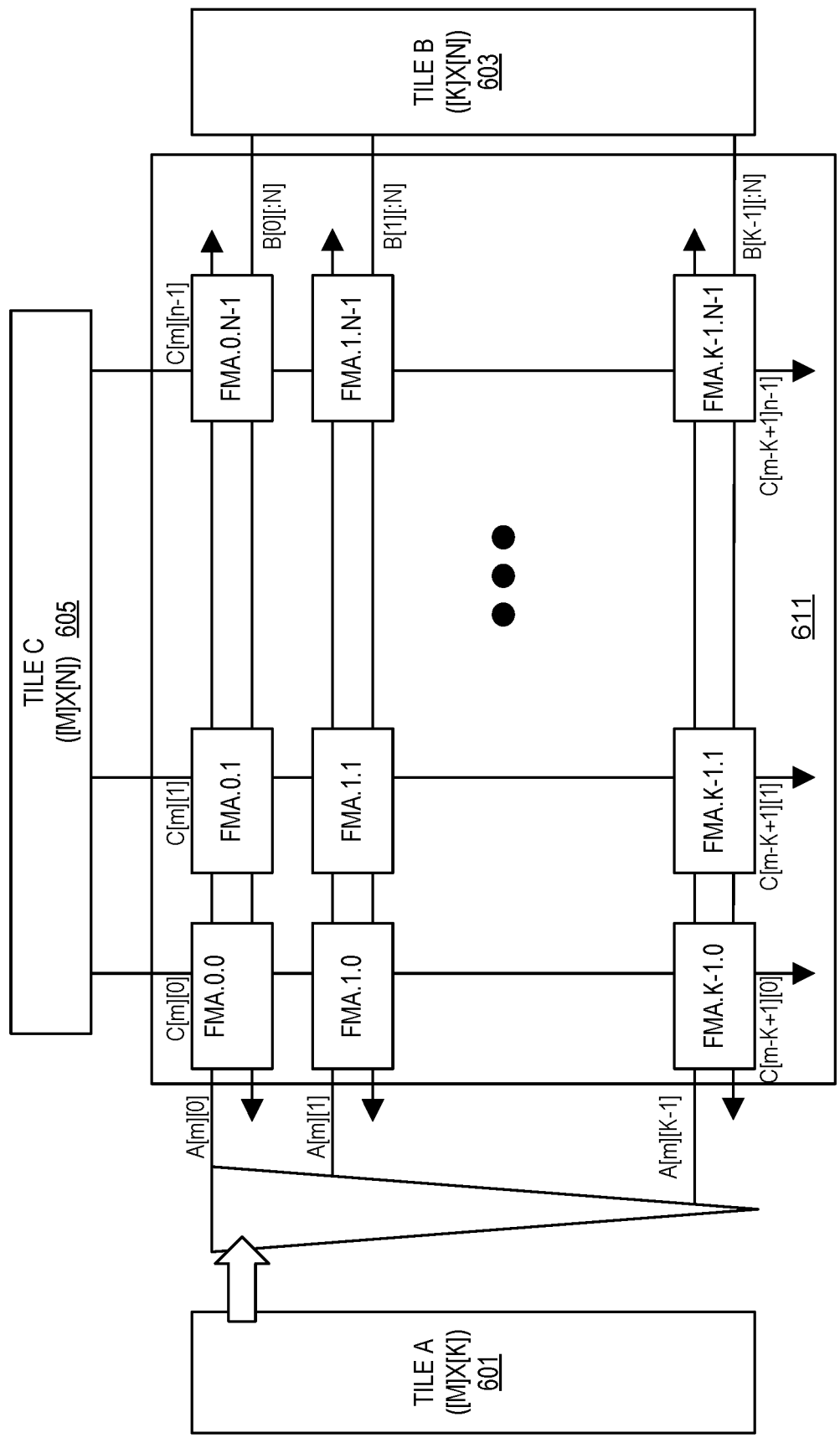
FIG. 6 illustrates an embodiment of matrix multiply accumulate operation using tiles ("TMMA")

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transposed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
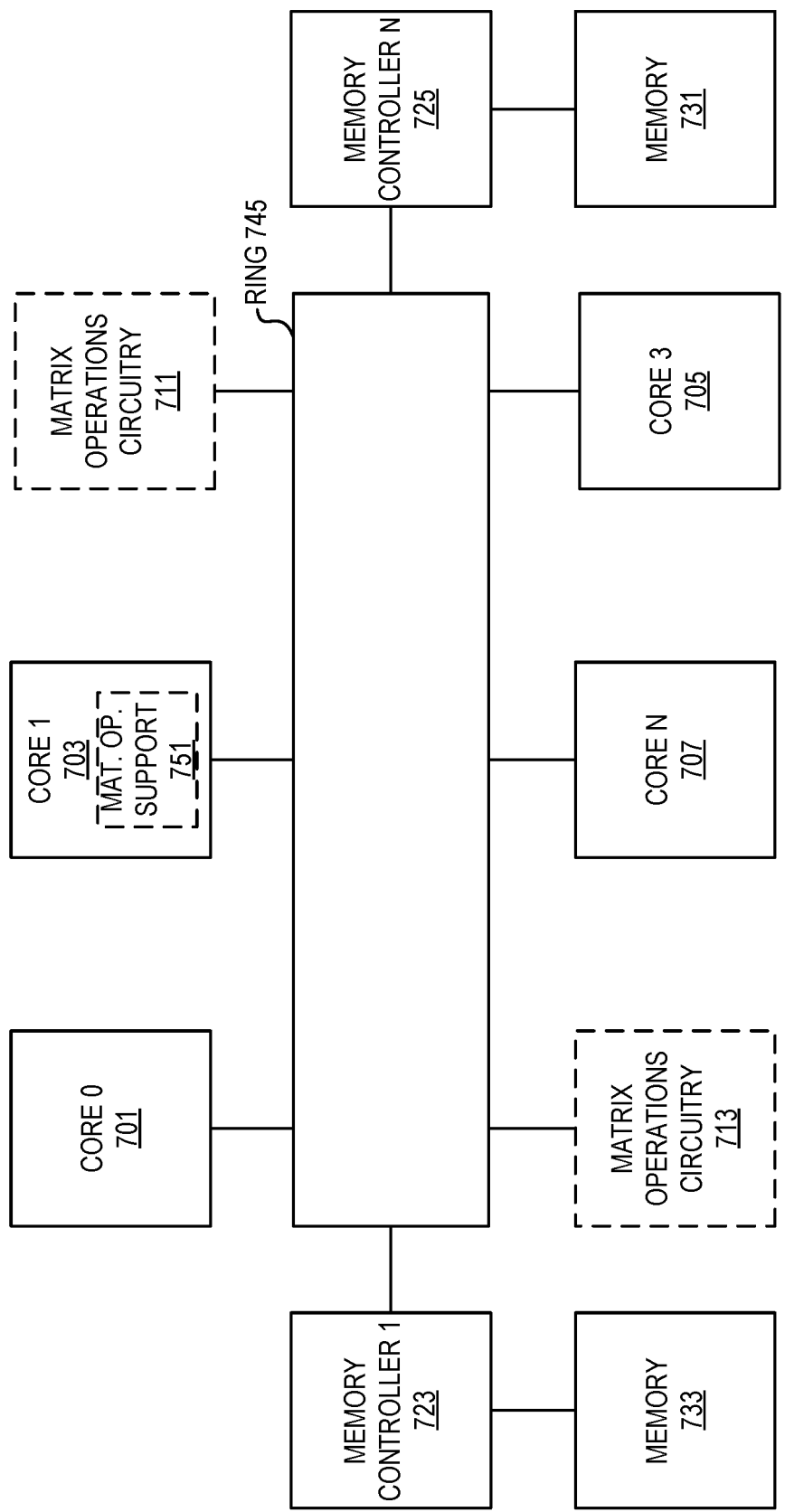
FIG. 7 illustrates an embodiment of a system utilizing matrix operations circuitry.

As hinted at earlier, matrix operations circuitry may be included in a core, or as an external accelerator. FIG. 7 illustrates an embodiment of a system utilizing matrix operations circuitry. In this illustration, a plurality of entities are coupled with a ring interconnect 745.

A plurality of cores 701, 703, 705, and 707 provide non-tile based instruction support. In some embodiments, matrix operations circuitry is provided in a core 703, and in other embodiments matrix operations circuitry 711 and 713 is accessible on the ring interconnect 745.

Additionally, one or more memory controllers 723-725 are provided to communicate with memory 733 and 731 on behalf of the cores and/or matrix operations circuitry.

Figure 8:
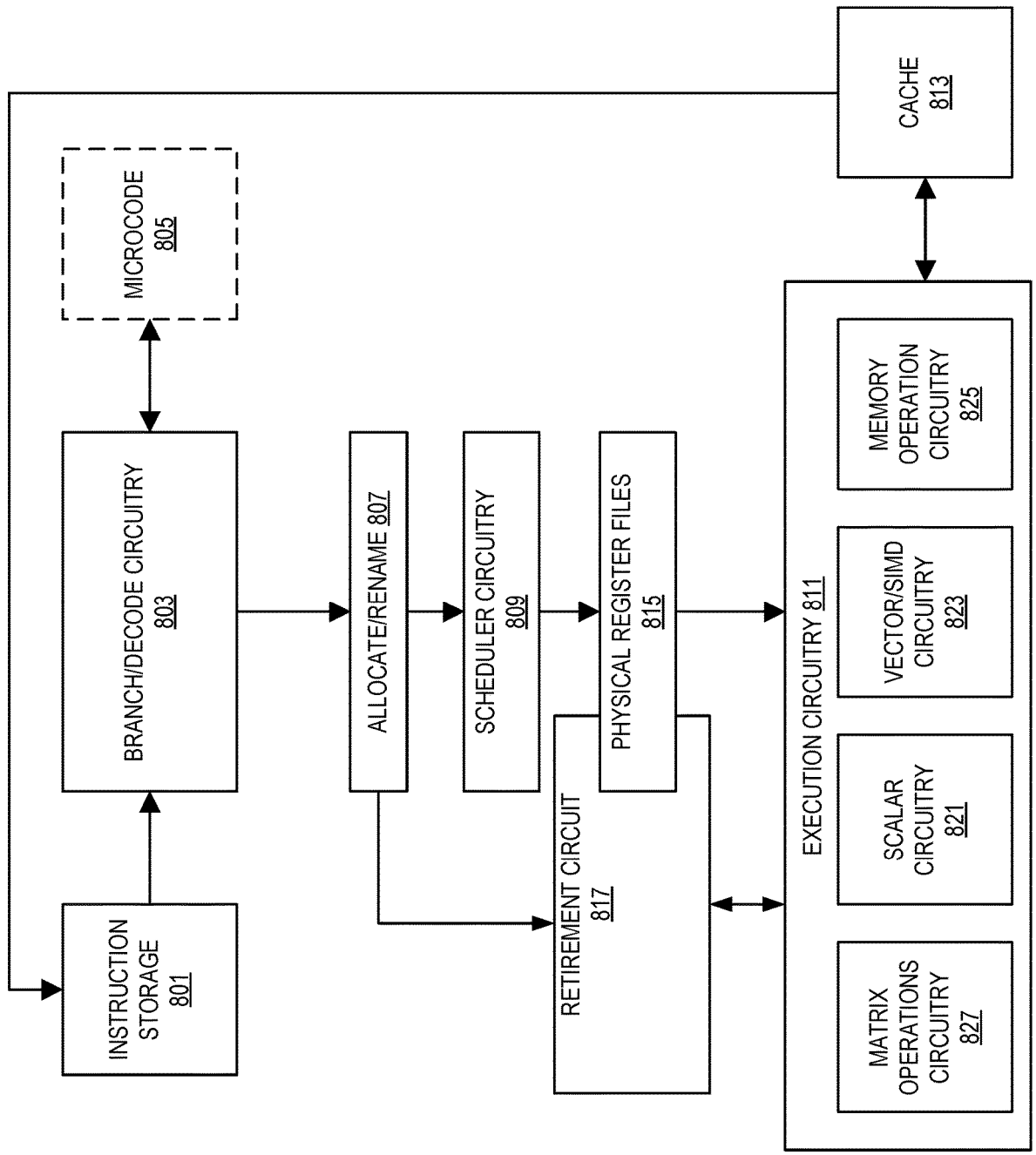
FIG. 8 illustrates an embodiment of a processor core pipeline supporting matrix operations using tiles.

FIG. 8 illustrates an embodiment of a processor core pipeline supporting matrix operations using tiles. Branch prediction and decode circuitry 803 performs branch predicting of instructions, decoding of instructions, and/or both from instructions stored in instruction storage 801. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 805. The branch prediction and decode circuitry 803 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 803 is coupled to a rename/allocator circuitry 807 which is coupled, in some embodiments, to scheduler circuitry 809. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 809 represents any number of different schedulers, including reservations stations, central instruction window, etc. The scheduler unit(s) scheduler circuitry 809 is coupled to, or includes, physical register file(s) 815. Each of the physical register file(s) 815 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 815 comprises vector registers circuitry, write mask registers circuitry, and scalar registers circuitry. These register circuits may provide architectural vector registers, vector mask registers, and general purpose registers. The physical register file(s) 815 is overlapped by a retirement circuit 817 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 817 and the physical register file(s) 815 are coupled to the execution circuit(s) 811.

While register renaming is described in the context of out-of-order execution, it should be understood that register renaming may be used in an in-order architecture. While the illustrated embodiment of the processor may also include separate instruction and data cache units and a shared L2 cache unit 813, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 811 a set of one or more execution circuits 821, 823, and 827 and a set of one or more memory access circuits 825. The execution circuits 821, 823, and 827 perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scalar circuitry 821 performs scalar operations, the vector/SIMD circuitry 823 performs vector/SIMD operations, and matrix operations circuitry 827 performs matrix (tile) operations detailed herein.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement a pipeline as follows: 1) an instruction fetch circuit performs fetch and length decoding stages; 2) the branch and decode circuitry 803 performs a decode stage; 3) the rename/allocator circuitry 807 performs an allocation stage and renaming stage; 4) the scheduler circuitry 809 performs a schedule stage; 5) physical register file(s) (coupled to, or included in, the scheduler circuitry 807 and rename/allocate circuitry 807 and a memory unit perform a register read/memory read stage; the execution circuitry 811 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

Figure 9:
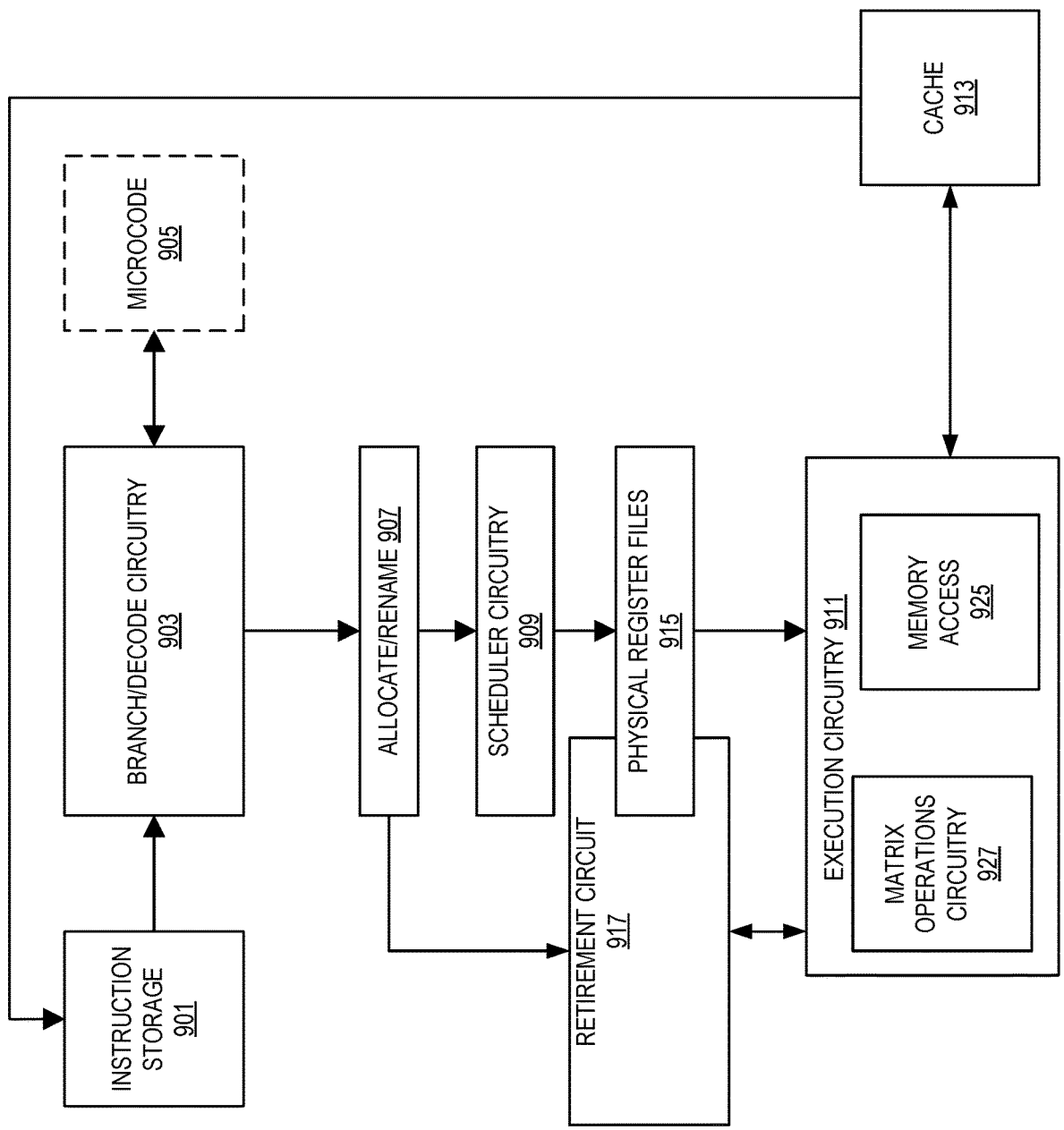
FIG. 9 illustrates an embodiment of a processor core pipeline supporting matrix operations using tiles.

FIG. 9 illustrates an embodiment of a processor core pipeline supporting matrix operations using tiles. Branch prediction and decode circuitry 903 performs branch predicting of instructions, decoding of instructions, and/or both from instructions stored in instruction storage 901. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 905. The branch prediction and decode circuitry 903 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 903 is coupled to a rename/allocator circuitry 907 which is coupled, in some embodiments, to scheduler circuitry 909. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 909 represents any number of different schedulers, including reservations stations, central instruction window, etc. The scheduler unit(s) scheduler circuitry 909 is coupled to, or includes, physical register file(s) 915. Each of the physical register file(s) 915 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 915 comprises vector registers circuitry, write mask registers circuitry, and scalar registers circuitry. These register circuits may provide architectural vector registers, vector mask registers, and general purpose registers. The physical register file(s) 915 is overlapped by a retirement circuit 917 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 917 and the physical register file(s) 915 are coupled to the execution circuit(s) 911.

While register renaming is described in the context of out-of-order execution, it should be understood that register renaming may be used in an in-order architecture. While the illustrated embodiment of the processor may also include separate instruction and data cache units and a shared L2 cache unit 913, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 911 a set of one or more execution circuits 927 and a set of one or more memory access circuits 925. The execution circuits 927 perform matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 903 performs a decode stage; 3) the rename/allocator circuitry 907 performs an allocation stage and renaming stage; 4) the scheduler circuitry 909 performs a schedule stage; 5) physical register file(s) (coupled to, or included in, the scheduler circuitry 907 and rename/allocate circuitry 907 and a memory unit perform a register read/memory read stage; the execution circuitry 911 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L*N) will typically not work if M and L are not the same.

Detailed herein are embodiments of a matrix (tile) configuration ("TILECONFIG") instruction and its execution. Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

Figure 10:
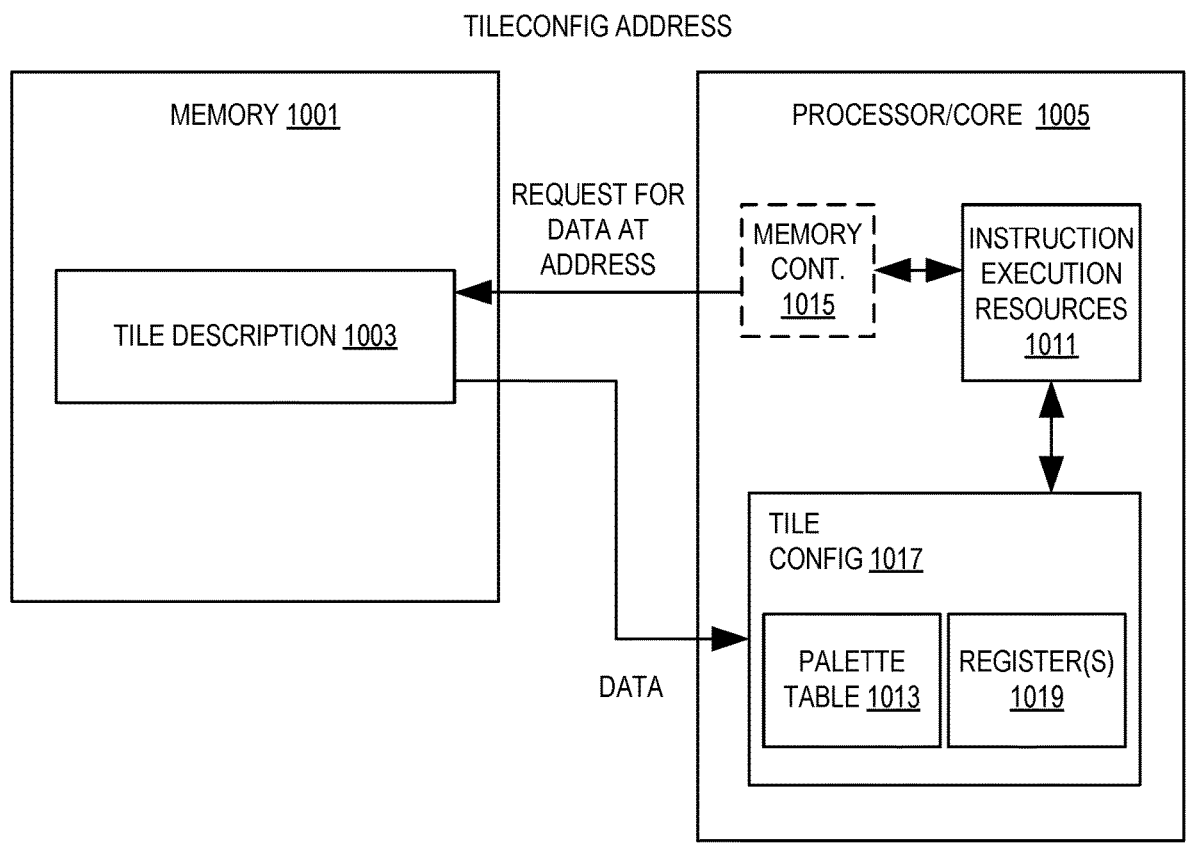
FIG. 10 illustrates an exemplary execution of a TILECONFIG instruction.

FIG. 10 illustrates an exemplary execution of a TILECONFIG instruction. The TILECONFIG instruction format includes fields for an opcode and a memory address.

As illustrated, the TILECONFIG instruction uses the address as a pointer to a memory 1001 location containing the description of the matrices (tiles) to be supported 1003.

Execution circuitry 1011 of a processor/core 1005 performs the TILECONFIG by retrieving the description 1003 from memory 1001 via a memory controller 1015, configuring tiles for a palette (setting the number of rows and columns) in a tile configuration 1017, and marking that matrix support is in use. In particular, instruction execution resources 1011 are configured to use tiles as specified by setting tile configurations 1017. The instruction execution resources may also include a machine specific register or configuration register to indicate tile usage.

Tile configurations 1017 are set to indicate parameters per tile as indicated by the tile description 1003 via the execution of the TILECONFIG instruction. The set parameters are the number of rows and columns per tile. Additional values such as in-use and start values are also set. The tile configurations 1017 utilize one or more registers 1019 to store tile usage and configuration information.

Figure 11A:
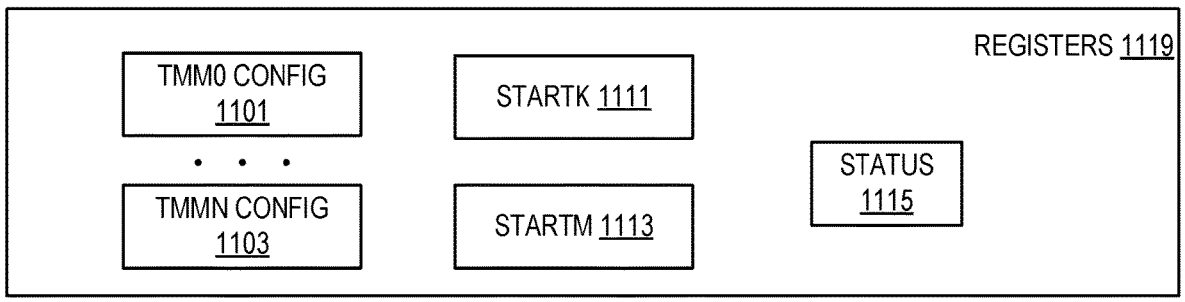
FIGS. 11(A)-(D) illustrate examples of a register(s)

FIGS. 11(A)-(D) illustrate examples of a register(s) 1019. FIG. 11(A) illustrates a plurality of registers 1019. As shown each tile (TMM0 1101 . . . TMMN 1103) has a separate register with each register storing a row and column size for that particular tile. StartK and StartM are stored in separate registers 1111 and 1113. One or more status registers 1115 are set (e.g., TILES_CONFIGURED=1) to indicate tiles are configured for use.

Figure 11B:
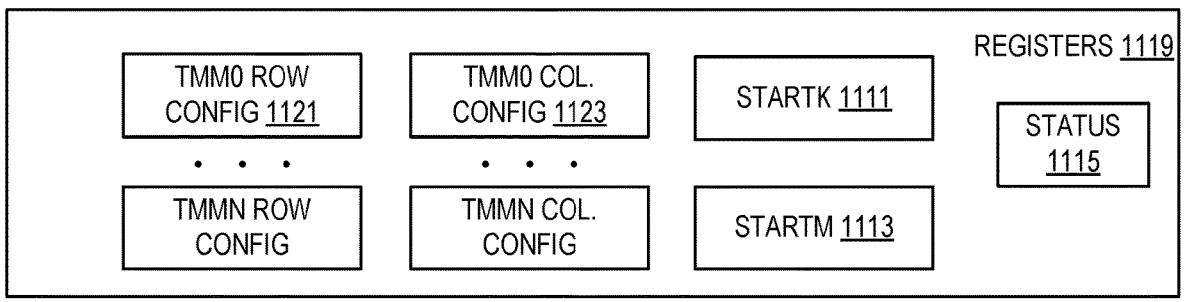

FIG. 11(B) illustrates a plurality of registers 1019. As shown each tile has separate registers for its rows and columns. For example, TMM0 rows configuration 1121, TMM0 columns configuration 1123, StartK and StartM are stored in separate registers 1111 and 1113. One or more status registers 1115 are set (e.g., TILES_CONFIGURED=1) to indicate tiles are configured for use.

Figure 11C:
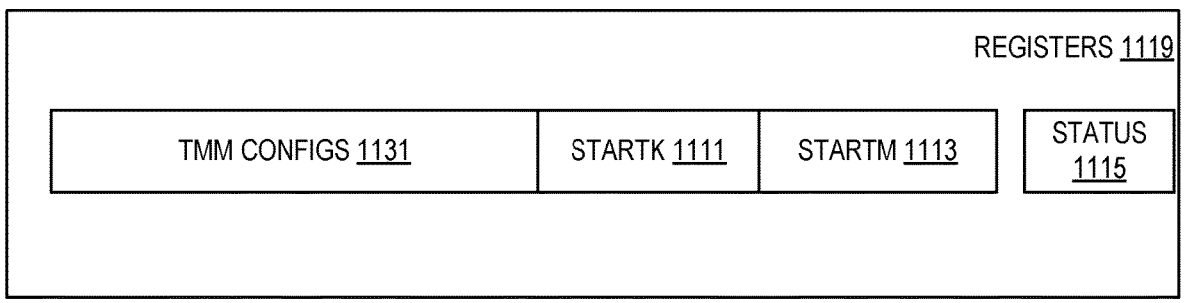

FIG. 11(C) illustrates a single register 1019. As shown, this register stores tile configurations (rows and columns per tile) 1131, StartK 1133, and StartM 1133 are stored in single register as packed data registers. One or more status registers 1115 are set (e.g., TILES_CONFIGURED=1) to indicate tiles are configured for use.

Figure 11D:
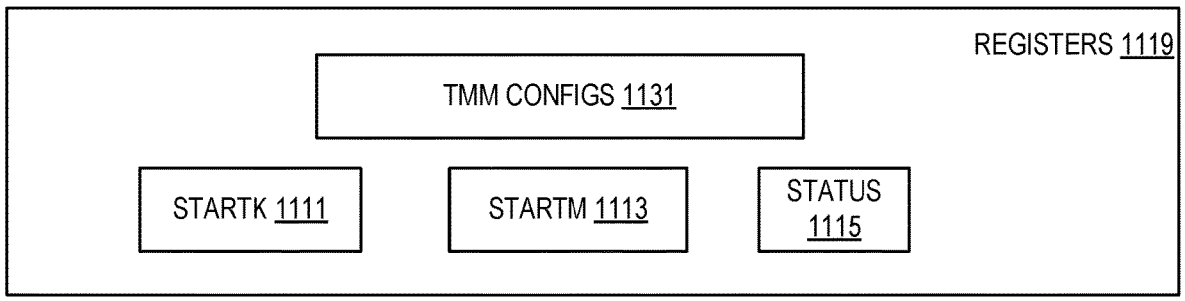

FIG. 11(D) illustrates a plurality of registers 1019. As shown, a single register stores tile configurations (rows and columns per tile) 1131. StartK and StartM are stored in separate registers 1111 and 1113. One or more status registers 1115 are set (e.g., TILES_CONFIGURED=1) to indicate tiles are configured for use.

Other combinations are contemplated such as combining the start registers into a single register where they are shown separately, etc.

FIG. 12 illustrates an embodiment of a description of the matrices (tiles) to be supported. In this example, each field is a byte. In byte[0], a palette ID 1201 is stored. The palette ID is used to index a palette table 1013 which stores, per palette ID, a number of bytes in a tile, and bytes per row of the tiles that are associated with this ID as defined by the configuration. In some embodiments, the palette table 1013 includes a size of a backing state storage area.

Bytes 1-7 are reserved and are typically zero in some embodiments. In other embodiments, the at least one of these bytes includes a size of a backing state storage area.

Bytes 8-9 store a value for a "startM" register 1203 and bytes 10-11 store a value for a "startK" register 1205. To support restarting instructions after these events, the instructions store information these registers. The startM indicates a row that should be used for restart. The startK indicates a position in the inner-product for relevant operations. The position in the row (the column) is not needed. Two-dimensional operations like the element-wise addition/subtraction/multiplication only use startM. Three-dimensional operations use values from both startM and startK. Typically, operations that only require startM will zero startK when writing startM.

Any time an interrupted tile instruction is not restarted, in some embodiments, it is the responsibility of software to zero the startM and startK values. For example, unmasked floating point exception handlers might decide to finish the operation in software and change the program counter value to another instruction, usually the next instruction. In this case the software exception handler must zero the startM and startK values in the exception frame presented to it by the operating system before resuming the program. The operating system will subsequently reload those values.

Bytes 16-17 store the number of rows 1213 and columns 1215 for tile 0, bytes 18-19 store the number of rows and columns for tile 1, etc. In other words, each 2 byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to the INIT state with 0 rows, 0 columns.

Finally, the configuration in memory typically ends with an ending delineation such as all zeros for several consecutive bytes.

While the above describes the use of tiles in matrix operations, the underlying registers (or other storage means) may also be used as a register state cache. That is, these registers allow for larger data to be stored than in a conventional processor only have vector (SIMD) registers. However, the use of the tile registers may have a negative impact when the time comes to write out the data from these registers (for example, on a context switch).

While the above describes the use of tiles in matrix operations, the underlying registers (or other storage means) may also be used as a register state cache. That is, these registers allow for larger data to be stored than in a conventional processor that only has vector (SIMD) registers. However, the use of the tile registers may have a negative impact when the time comes to write out the data from these registers (for example, on a context switch).

Figure 13:
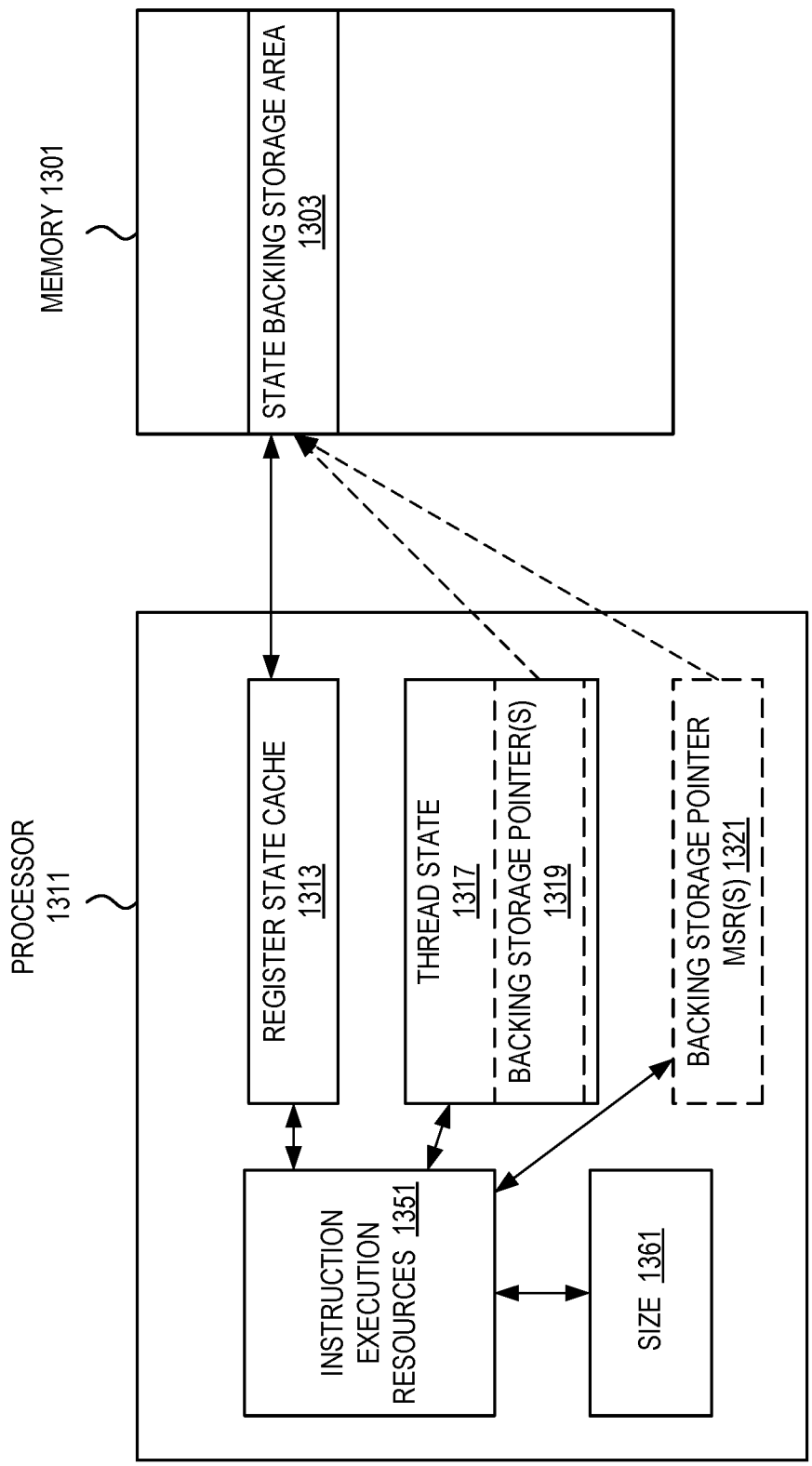
FIG. 13 illustrates an example of an embodiment for support for usage of state backing storage area with a register state cache.

FIG. 13 illustrates an example of an embodiment for support for usage of state backing storage area with a register state cache.

The register state cache 1313 may take on different functionality depending upon the embodiment. Exemplary register types of the register state cache 1313 include, but are not limited to: multidimensional registers (tiles), packed data (vector or SIMD) registers, general purpose registers, floating point registers, machine specific registers (MSRs), etc.

In some embodiments, the register state cache 1313 holds thread register state (e.g., data itself or a portion thereof).

In some embodiments, the register state cache 1313 functions as an OS managed cache. For example, when acting as an OS managed cache the register state cache 1313 may hold data and/or paging translation information (used if the pointer is linear/virtual address). Typically, the register state cache 1313 can be dirty with respect to the state backing storage area 1303 (in other words, there is no guarantee that the state backing storage area 1303 is the same as the register state cache 1313).

In some embodiments, the register state cache 1313 also holds state information including, but not limited to: invalid state (e.g., no register is loaded in the register state cache 1313); valid state (e.g., some/all registers are loaded in the register state cache 1313 and are identical to the value that was read from state backing storage area 1303 and/or also hold valid paging translation information; and dirty state (e.g., some/all registers of the register state cache 1313 hold modified data and/or holds valid paging translation information).

The registers of the register state cache 1313 are accessed as any other logical register (e.g., register 0, T0, TMM, etc.).

In some embodiments, these registers are used as a memory proxy source. For example, while an instruction may indicate a logical register name, the processor 1311 may issue an implicit read from the memory address of the state backing storage area 1303 as a source. When used as a memory proxy source the processor 1311 (e.g., memory access and/or rename/allocator unit) will make a check for read, or read and write, permissions to the state backing storage area 1303. The processor 1311 (e.g., memory access and/or rename/allocator unit) may bring the data from the register state cache 1313 or from the state backing storage area 1303.

In some embodiments, these registers are used as a memory proxy destination (as an implicit write to memory). When used as a memory proxy source the processor 1311 (e.g., memory access and/or rename/allocator unit) will make a check for write permissions to the state backing storage area 1303. The processor 1311 (e.g., memory access and/or rename/allocator unit) may write the data to the register state cache 1313 and hold the dirty data only in it, or also update the state backing storage area 1303.

When used, the state backing storage area 1303 contains the latest register state cache value after specific operations. For example, the register state cache 1313 may be flushed to the backing storage memory 1303 (e.g., when synchronization is required) using a state save (such as a XSAVE) operation. Between these operations the processor 1311 may read/prefetch a register value from the state backing storage area 1303 into the register state cache 1313, or write back a modified register from the register state cache 1313 into the state backing storage area 1303. For example, in some embodiments, dirty data is written back whenever the processor 1311 finds it necessary without the need for the OS or application to intervene.

The state backing storage area 1303 in memory 1301 is associated with a set of one or more registers of a register state cache 1313. This association is through one or more backing storage pointer(s) stored in the processor 1311. This pointer points to an address in memory that begins the state backing storage area 1303. In some embodiments, the backing storage pointer 1319 is stored as part of a software thread state 1317. For example, in a tile usage case, the backing storage pointer 1319 is stored in palette table 1813 as a field.

In other embodiments, a machine specific register (MSR) 1321 is utilized to store to the backing storage pointer. This MSR 1321 may also store a size of the state backing storage area 1303 in some embodiments. In other embodiments, the size of the state backing storage area 1303 is stored in other locations 1361 such as a different MSR or as a part of tile configuration, palette table, etc. The size of the size of the state backing storage area 1303 may also be ascertained by adding the size of each of the configured tiles in some embodiments.

The setting (association) of the backing storage pointer in 1319 or 1321 may be set in one or several different ways. The association is performed via an operating system (OS) or application running on the OS executing an instruction on instruction execution resources 1351 to set the pointer. In some instances, the state backing storage area is also zeroed when the association is made.

For example, in some embodiments, the TILECONFIG instruction detailed above is used to set the backing storage pointer in 1319 or 1321. The TILECONFIG instruction includes the backing storage pointer information. The size of the state backing storage area 1303 comes from the information associated with the tile usage detailed above (e.g., per palette ID, a number of bytes in a tile, and bytes per row of the tiles that are associated with this ID).

In other embodiments, a dedicated backing storage configuration instruction is utilized. This instruction provides the backing storage pointer information starting address and a size of the state backing storage area 1303.

In some embodiments, any attempt to access the logical register without properly setting the state backing storage beforehand will result in a general protection fault. For example, using tiles without setting the backing storage pointer in 1319 or 1321.

The above described register state cache and state backing storage area provide for many benefits. For example, a processor may hold small set of physical registers in the register state cache and an attempt by the software to access a logical register that is not in the cache will result in eviction of register from the cache and fill of the desired register from the state backing storage area. Additionally, the processor or software may also utilize the state backing storage area for saving data that would ordinarily be stored in expensive on-die components (for example, power management events in which the state will be saved in memory instead of expensive on die SRAM). Context switch, save/restore latency may be reduced through the use of a register state cache as a coherent cache (so any write to a register is instantly exposed). This is different than using a save state command/instruction (such as XSAVE) which saves out all of that state. The state of any of the registers of the register state cache could also be added to user space paged kernel memory instead of putting the non-user space paged kernel memory.

Figure 14:
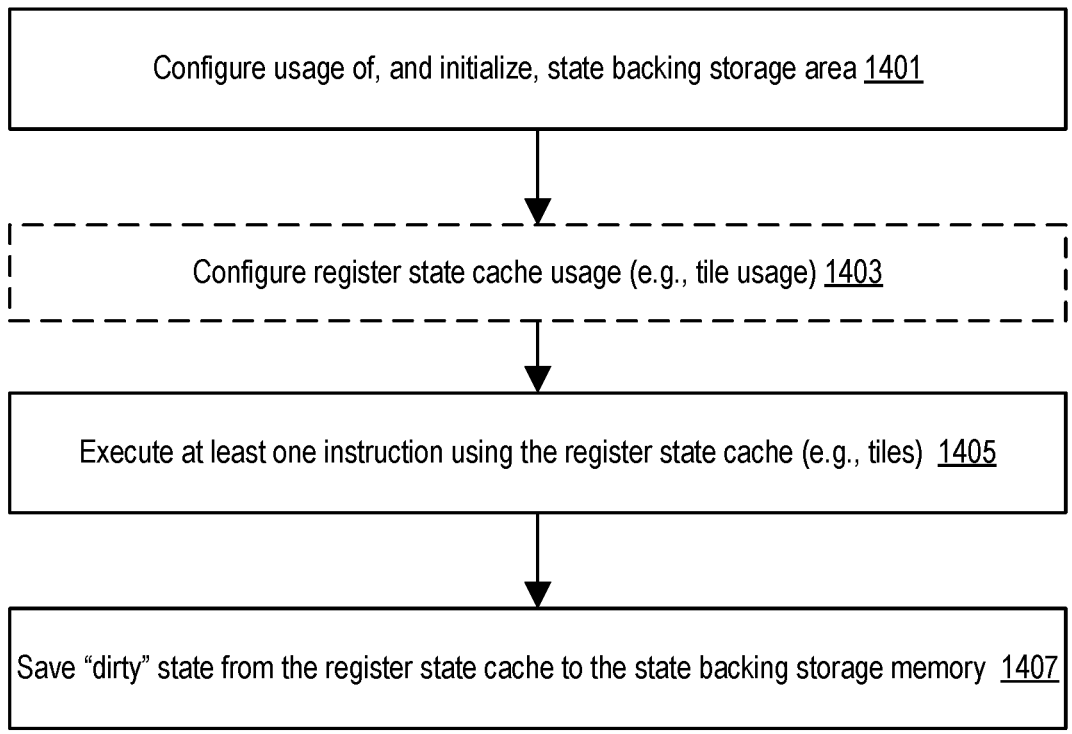
FIG. 14 illustrates an example of an embodiment a method of state backing storage area usage.

FIG. 14 illustrates an example of an embodiment a method of state backing storage area usage. At 1401, state backing storage area 1301 usage is configured and initialized to zero. For example, an association as detailed above is performed to set one or more backing storage pointers and set a size associated with each of the pointers.

In some embodiments, the usage configuration and initialization is performed as a part of a TILECONFIG instruction execution. In other embodiments, one or more dedicate state backing storage area creation and initialization instructions are executed to set the one or more In other embodiments, a dedicated state backing storage configuration instruction is utilized. This instruction provides the backing storage pointer information starting address and a size of the state backing storage area 1303.

Register state cache 1313 usage is configured in some embodiments at 1403. For example, when tiles are used a TILECONFIG instruction is executed to define the register state cache. Note that in some embodiments, 1401 and 1403 are performed together via a single instruction as detailed above.

At 1405, one or more instructions using the register state cache 1313 are executed. For example, tile based operations such as loading tiles into the register state cache, performing operations on loaded tiles, etc. are performed.

Data in registers that is "dirty" is stored out from the register state cache 1313 to the state backing storage area 1303 at 1407. This data may be stored as a part of a state save instruction (such as XSAVE) or via one or more store instructions. Depending on the implementation, the address of the state backing storage area generated from the state backing storage pointer (linear to physical address translation), or is found in the state backing storage pointer itself (no linear to physical address translation). In this context, "dirty" the data was modified directly in the register state cache 1313 and has not been written back to the state backing storage area 1303. The data may be marked as such as detailed above.

FIGS. 15(A)-(G) illustrate an example of register state cache and state backing storage usage. In these figures, components use similar numbering as the FIG. 13. It may be that not all descriptions of these figures will discuss each component, but the numbering is left for ease of understanding.

Figure 15A:
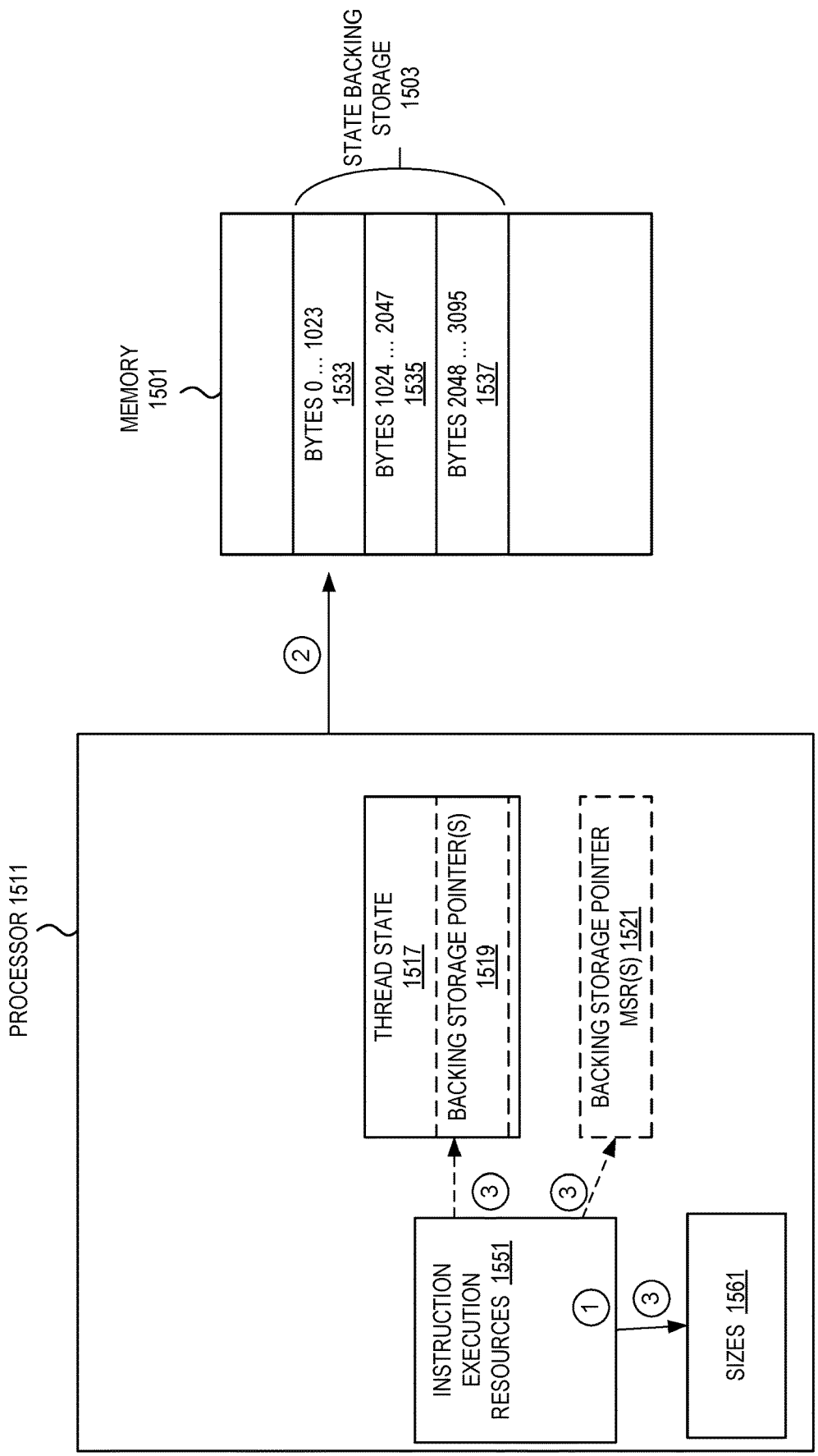
FIGS. 15(A)-(G) illustrate an example of register state cache and state backing storage usage.

FIG. 15(A) illustrates the configuration and initialization of state backing storage. As shown, processor 1511 includes instruction execution resources 1551 (for example, fetch circuitry, decode circuitry, functional unit circuitry, etc.) for executing instructions such as a configuration and/or initialization instruction(s) for the state backing storage area 1503 of memory 1501. One or more of these configuration and/or initialization instructions are executed at circle 1. The execution of these instructions causes, in this example, several different chunks of memory 1501 to be configured and initialized for state backing storage area 1503 as shown by circle 2. The three chunks 1533, 1535, and 1537 are all set to zero. Note that while the chunks are shown as consecutive, that does not need to be the case in most embodiments. Additionally, the execution of one or more of these configuration and/or initialization instructions causes one or more backing storage pointers to set along with backing storage size information 1561 at circle 3. As noted earlier, depending on the implementation, the one or more backing pointers may be a part of thread state 1517 (backing storage pointers 1519) or stored in one or more MSRs 1521. The size of the state backing storage area 1503 chunks is also stored.

Figure 15B:
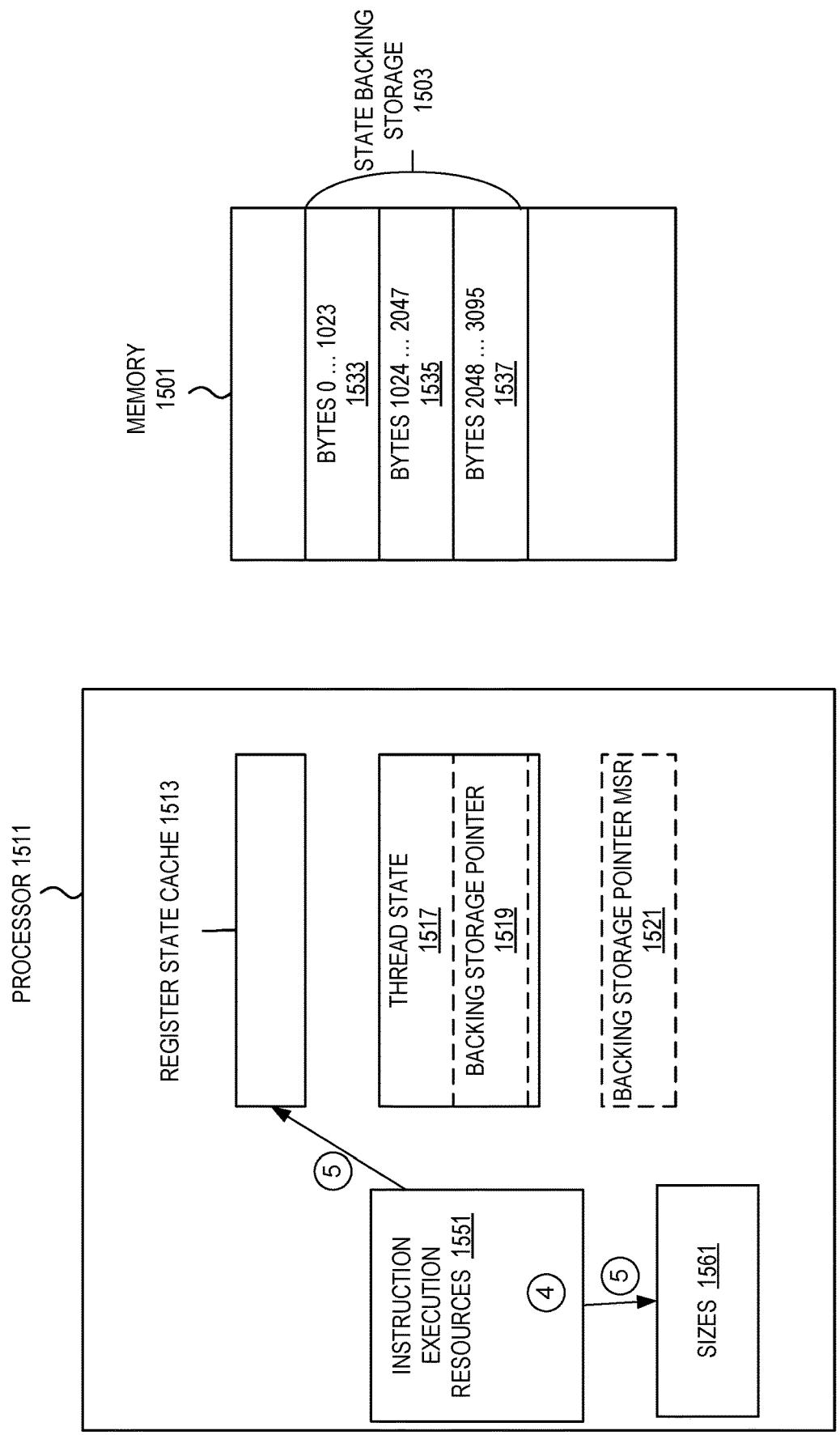

FIG. 15(B) illustrates the register state cache initialization. As shown, the instruction execution resources 1551 execute one or more instructions to initialize the register state cache 1513 at circle 4. For example, for tile usage, a TILECONFIG instruction is executed. The execution of these instructions causes the register state cache 1513 to be initialized and sizes of the registers of the register state cache 1513 are stored at circle 5.

Figure 15C:
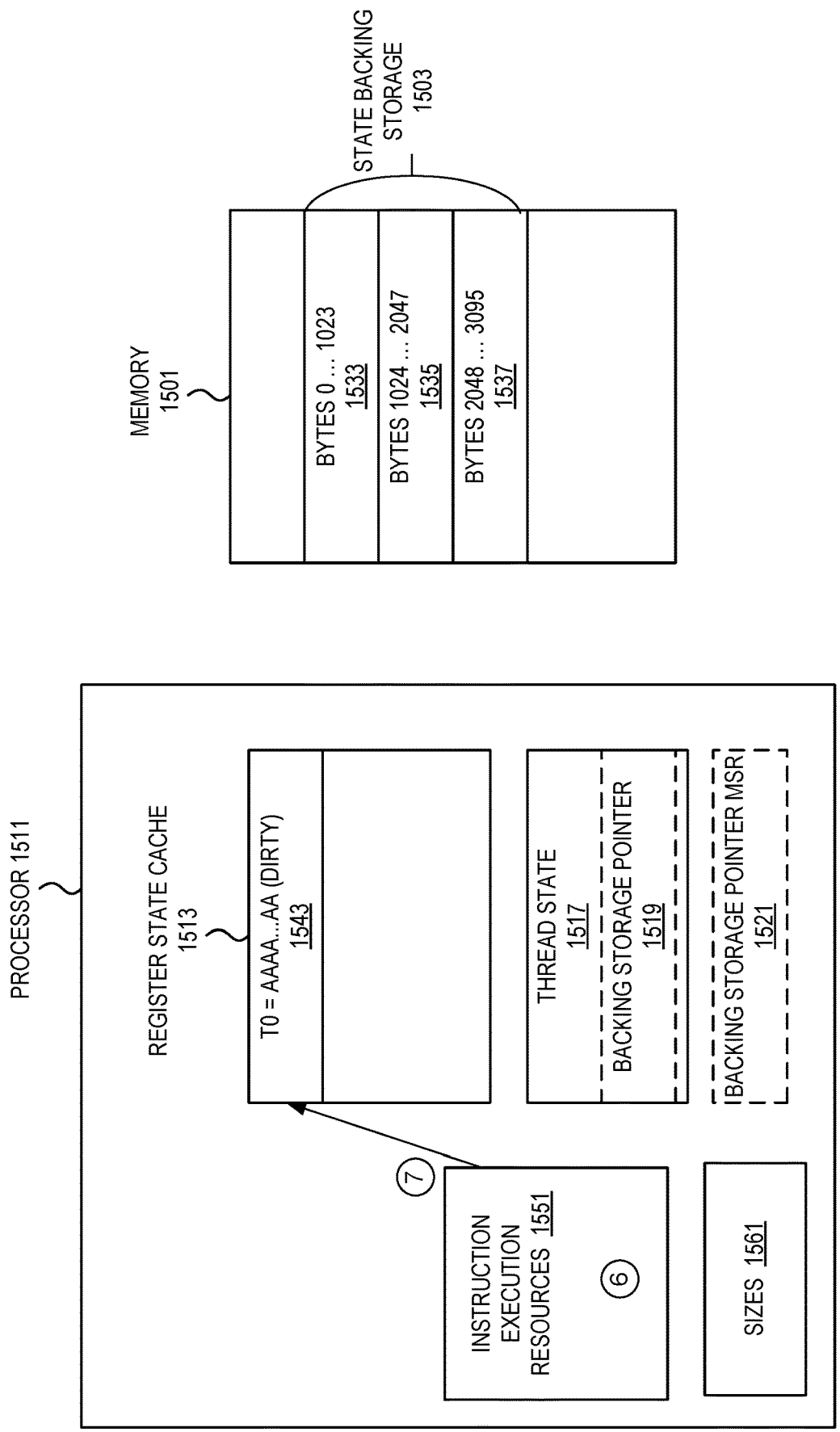

FIG. 15(C) illustrates a register (e.g., tile) of the register state cache being loaded. As shown, the instruction execution resources 1551 execute one or more instructions to load a register (e.g., tile) 1543 of the register state cache 1513 at circle 6. This register 1543 is loaded with values AAAA . . . AA at circle 7. Note that this register 1543 is marked as dirty with respect to the state backing storage area 1503.

Figure 15D:
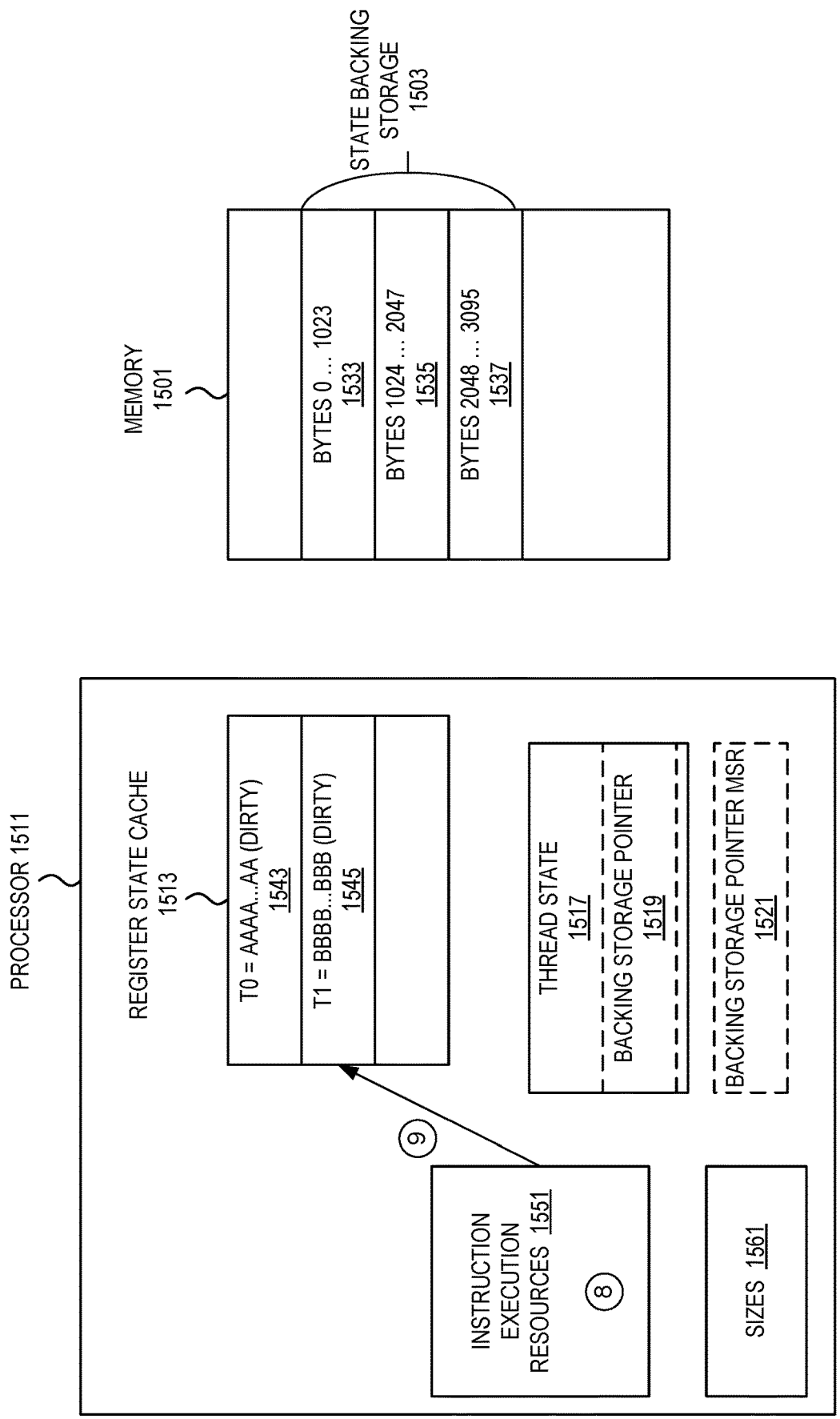

FIG. 15(D) illustrates a register (e.g., tile) of the register state cache being loaded. As shown, the instruction execution resources 1551 execute one or more instructions to load a register (e.g., tile) 1545 of the register state cache 1513 at circle 8. This register 1543 is loaded with values BBBB . . . BB at circle 9. Note that this register 1545 is marked as dirty with respect to the state backing storage area 1503.

Figure 15E:
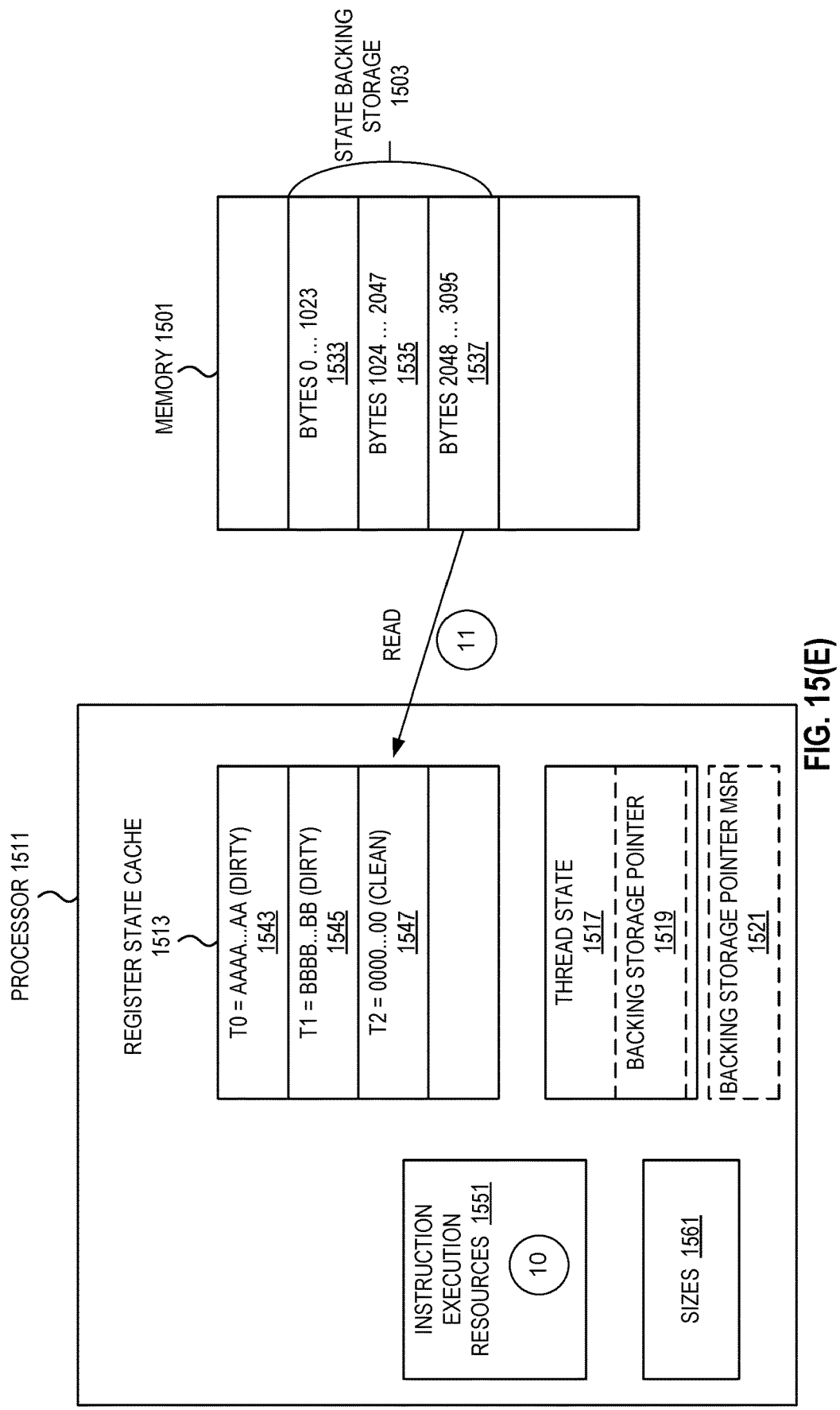

FIG. 15(E) illustrates a register (e.g., tile) of the register state cache being loaded from the state backing memory. As shown, the instruction execution resources 1551 execute one or more instructions to load a register (e.g., tile) 1547 of the register state cache 1513 from the state backing storage area 1503 at circle 10. This register 1547 is loaded with values 0000 . . . 00 at circle 11. Note that this register 1547 is marked as clean with respect to the state backing storage area 1503. In other words, it is consistent with the state backing storage chunk 1537.

Figure 15F:
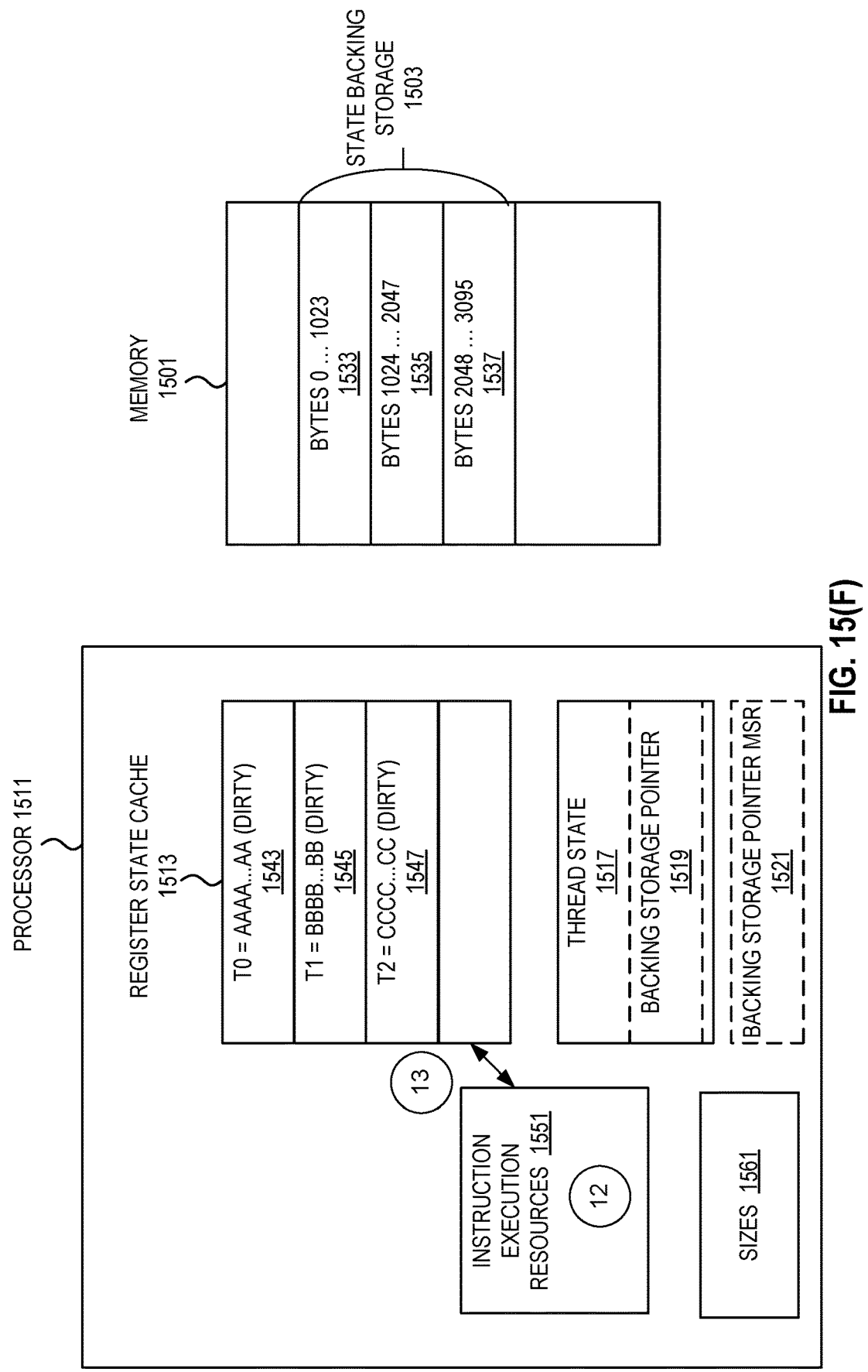

FIG. 15(F) illustrates a register (e.g., tile) operation using the register state cache. As shown, the instruction execution resources 1551 execute one or more register based instructions to perform one or more operations on at least one register (e.g., tile) 1543, 1545, 1547 of the register state cache 1513 at circle 12. In this illustration, the data of register 1547 after these instructions with values CCCC . . . CC at circle 13. Note that this register 1547 is marked as dirty with respect to the state backing storage area 1503. In other words, it is not consistent with the state backing storage chunk 1537 (which at this point is still 0000 . . . 00).

Figure 15G:
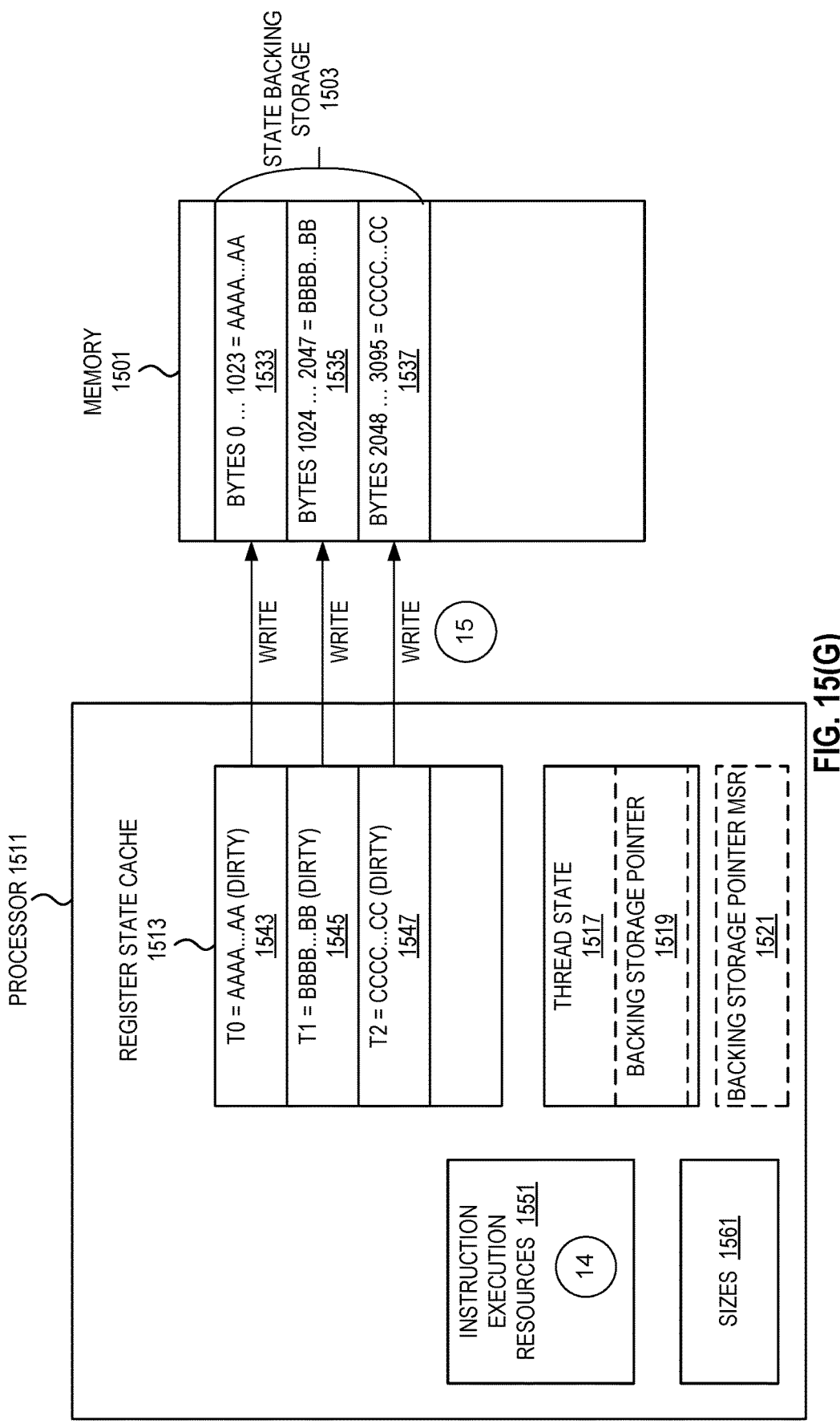

FIG. 15(G) illustrates the registers (e.g., tiles) from the register state cache being stored out to the state backing storage of memory. As shown, the instruction execution resources 1551 execute one or more storage instructions (for example, XSAVE) to store the date of the registers (e.g., tiles) 1543, 1545, 1547 of the register state cache 1513 into the state backing storage area 1503 at circle 14. In this illustration, the data of registers 1543, 1545, and 1547 are written to 1533, 1535, and 1537 respectively at circle 15. Note that while not shown the registers of the register state cache 1513 are marked as clean in some embodiments after this operation.

Detailed below are exemplary, architectures and systems that may be utilized for the above. For example, an exemplary pipeline supporting the instructions is detailed that includes circuitry to perform the methods detailed herein.

Exemplary Register Architecture

FIG. 16 is a block diagram of a register architecture 1600 according to one embodiment of the invention. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format QAC00 operates on these overlaid register file as illustrated in the below tables.

Write mask registers 1615—in the embodiment illustrated, there are 8 write mask registers (k0 through k7), each 64 bits in size. In an alternate embodiment, the write mask registers 1615 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 17A is a block diagram illustrating both an exemplary in-order pipeline and an exemplary register renaming, out-of-order issue/execution pipeline according to embodiments of the invention. FIG. 17B is a block diagram illustrating both an exemplary embodiment of an in-order architecture core and an exemplary register renaming, out-of-order issue/execution architecture core to be included in a processor according to embodiments of the invention. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 18B:
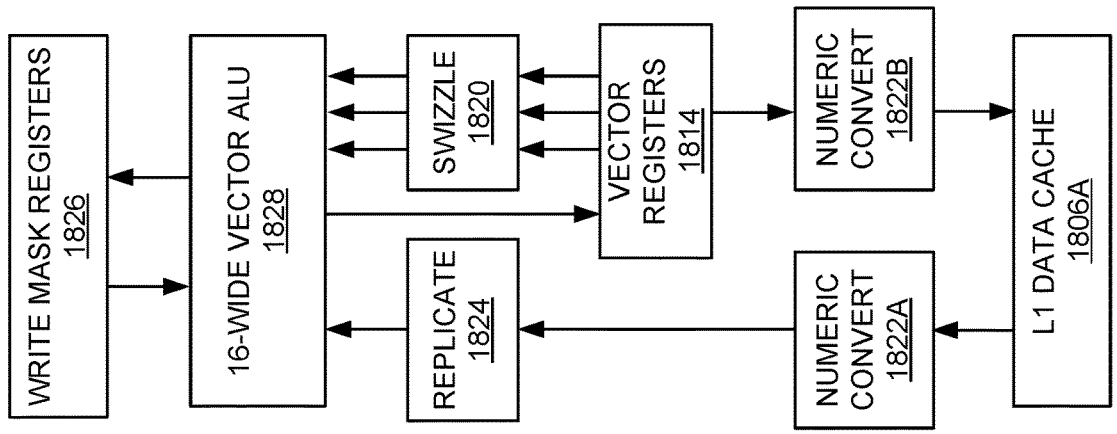
FIGS. 18A-B illustrate a block diagram of a more specific exemplary in-order core architecture, which core would be one of several logic blocks (including other cores of the same type and/or different types) in a chip.
Figure 18A:
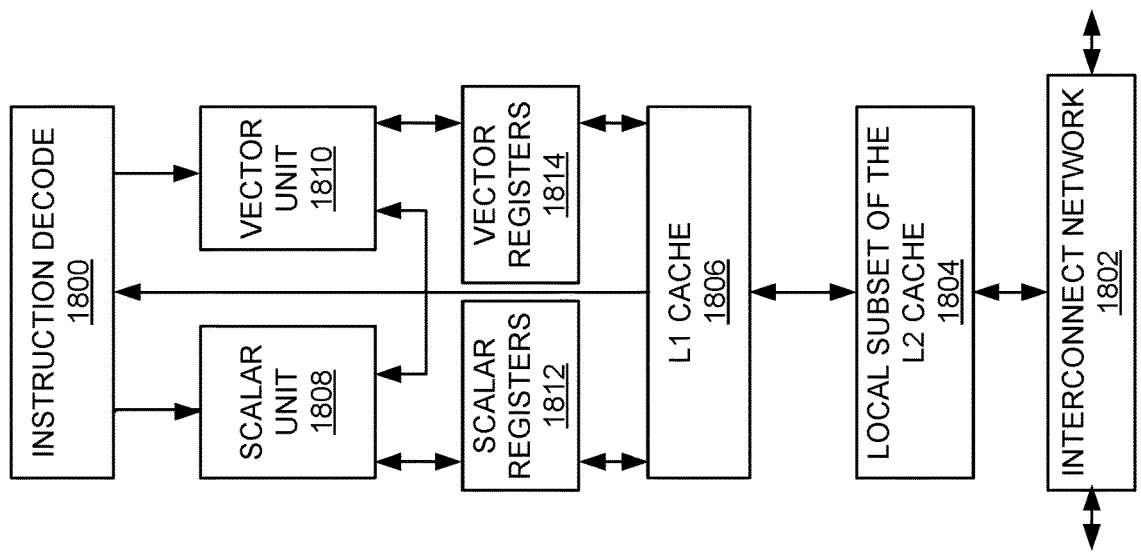

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the invention. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the invention may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to embodiments of the invention. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Figure 19:
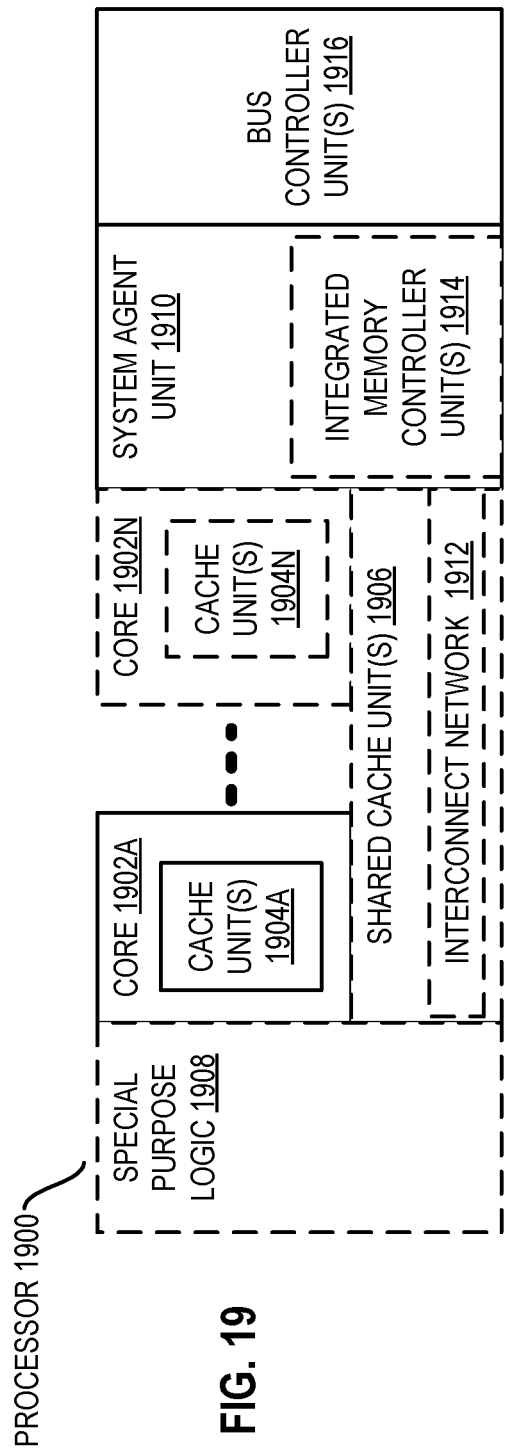
FIG. 19 is a block diagram of a processor 1900 that may have more than one core, may have an integrated memory controller, and may have integrated graphics according to embodiments of the invention.

FIG. 19 is a block diagram of a processor 1900 that may have more than one core, may have an integrated memory controller, and may have integrated graphics according to embodiments of the invention. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908 (integrated graphics logic 1908 is an example of and is also referred to herein as special purpose logic), the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902-A-N.

In some embodiments, one or more of the cores 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
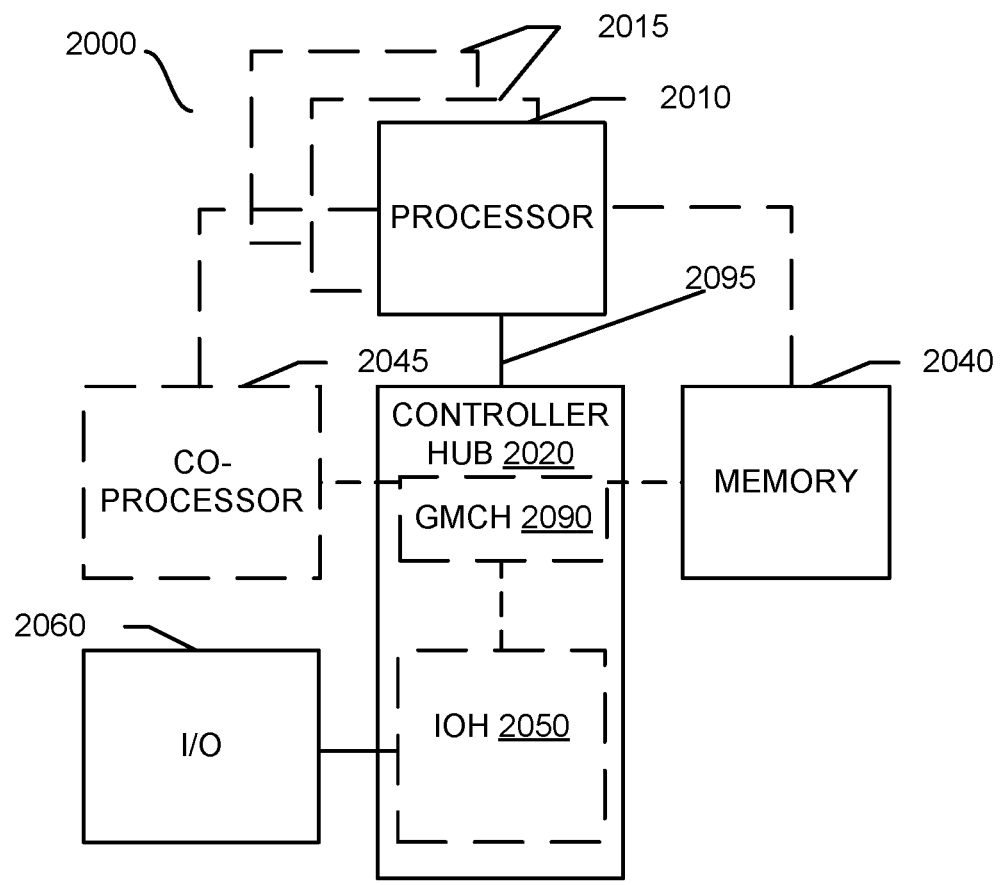
FIG. 20 shown a block diagram of a system in accordance with one embodiment of the present invention.

Referring now to FIG. 20, shown is a block diagram of a system 2000 in accordance with one embodiment of the present invention. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
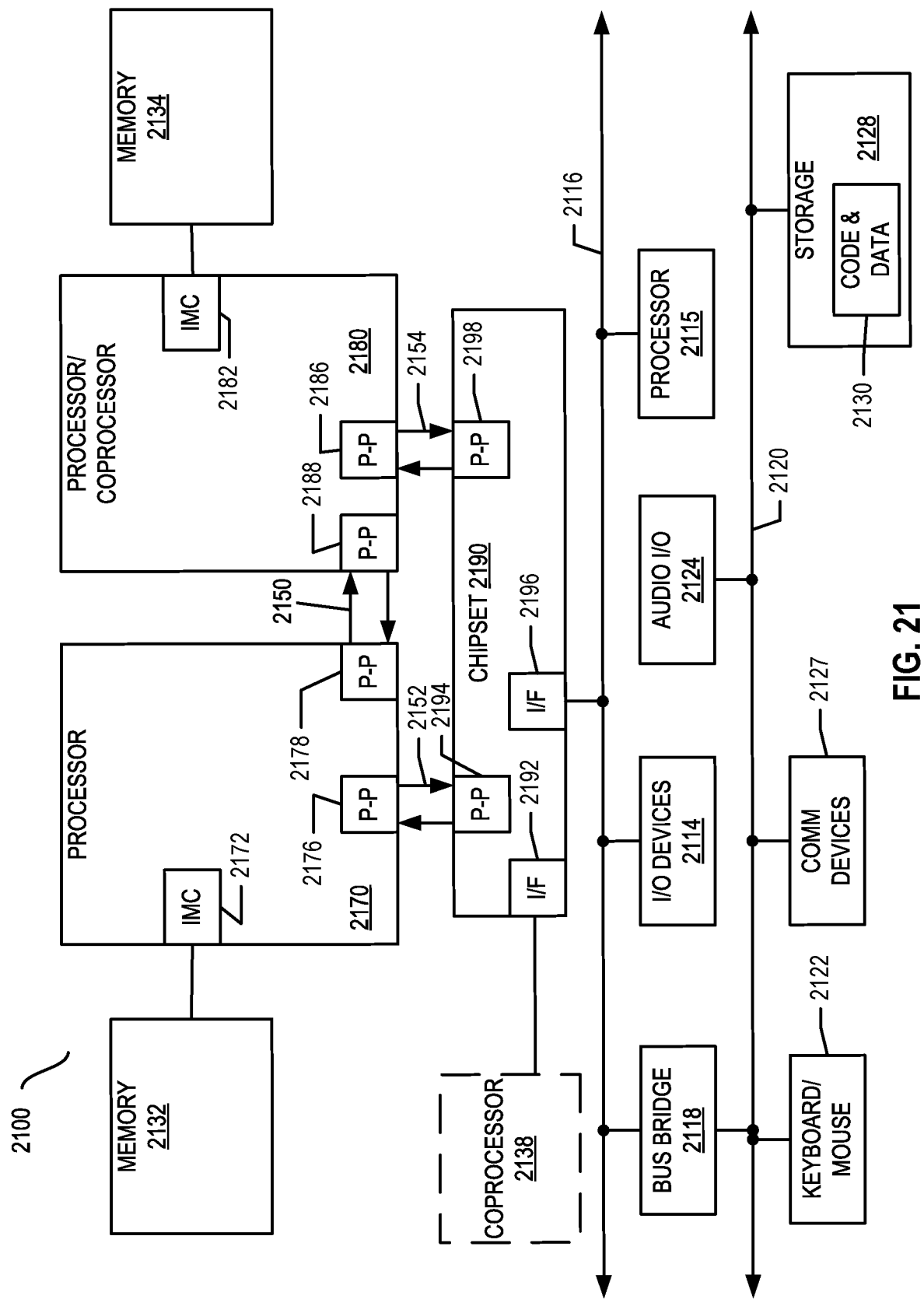
FIG. 21 is a block diagram of a first more specific exemplary system in accordance with an embodiment of the present invention.

Referring now to FIG. 21, shown is a block diagram of a first more specific exemplary system 2100 in accordance with an embodiment of the present invention. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the invention, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2192. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present invention is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
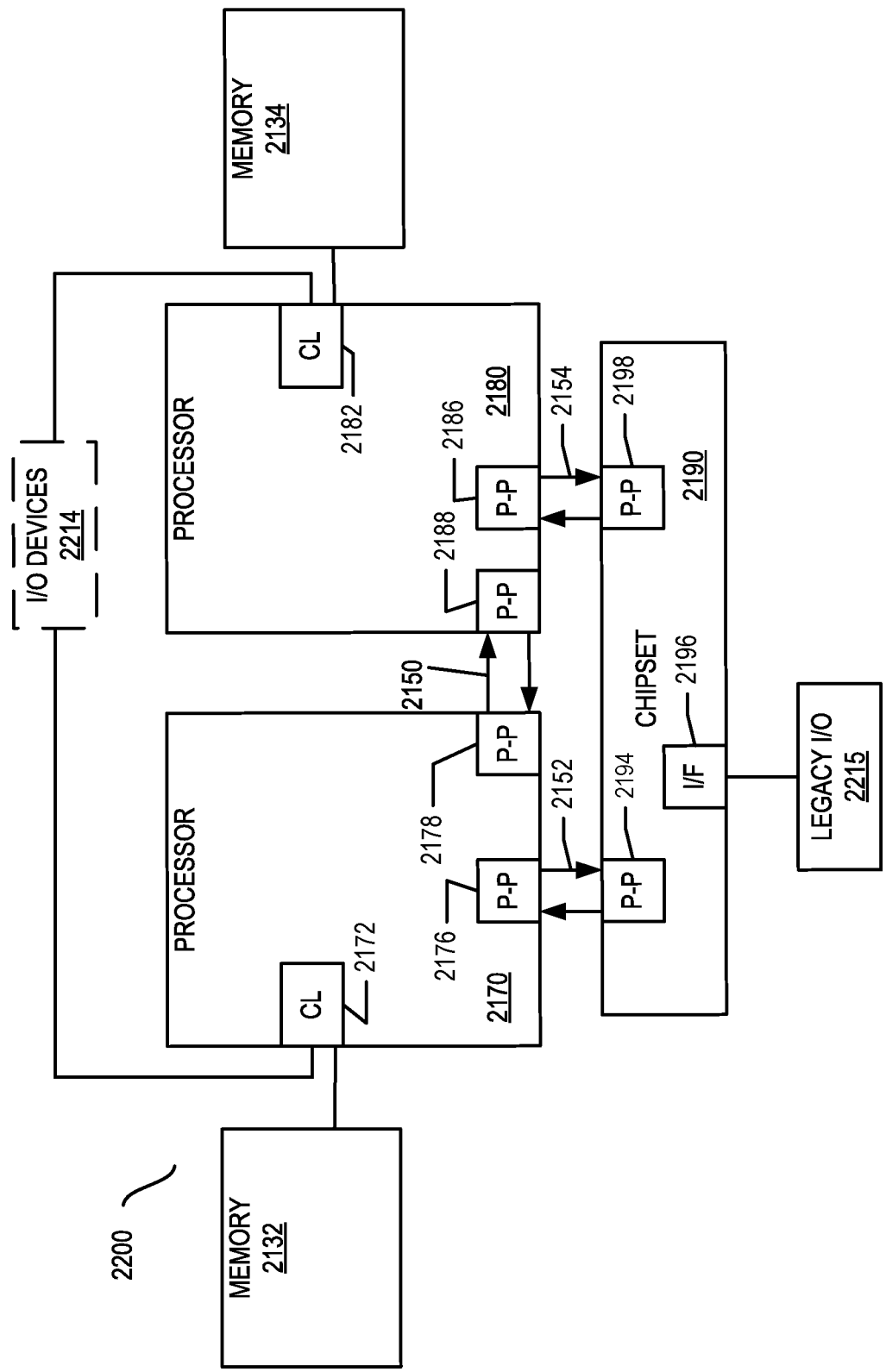
FIG. 22 is a block diagram of a second more specific exemplary system in accordance with an embodiment of the present invention.

Referring now to FIG. 22, shown is a block diagram of a second more specific exemplary system 2200 in accordance with an embodiment of the present invention. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Figure 23:
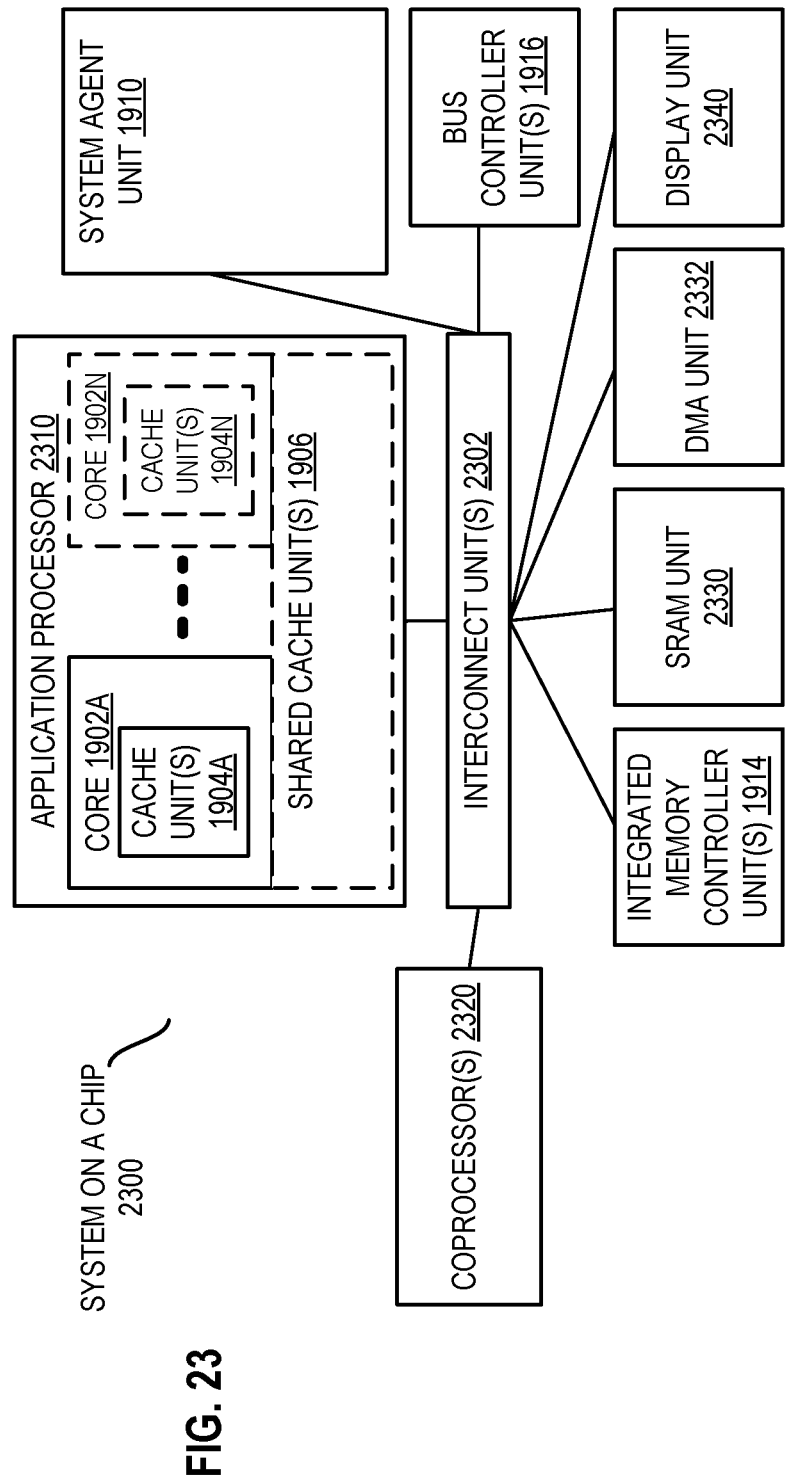
FIG. 23 is a block diagram of a SoC in accordance with an embodiment of the present invention.

Referring now to FIG. 23, shown is a block diagram of a SoC 2300 in accordance with an embodiment of the present invention. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 1902A-N, which include cache units 1904A-N, and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 24:
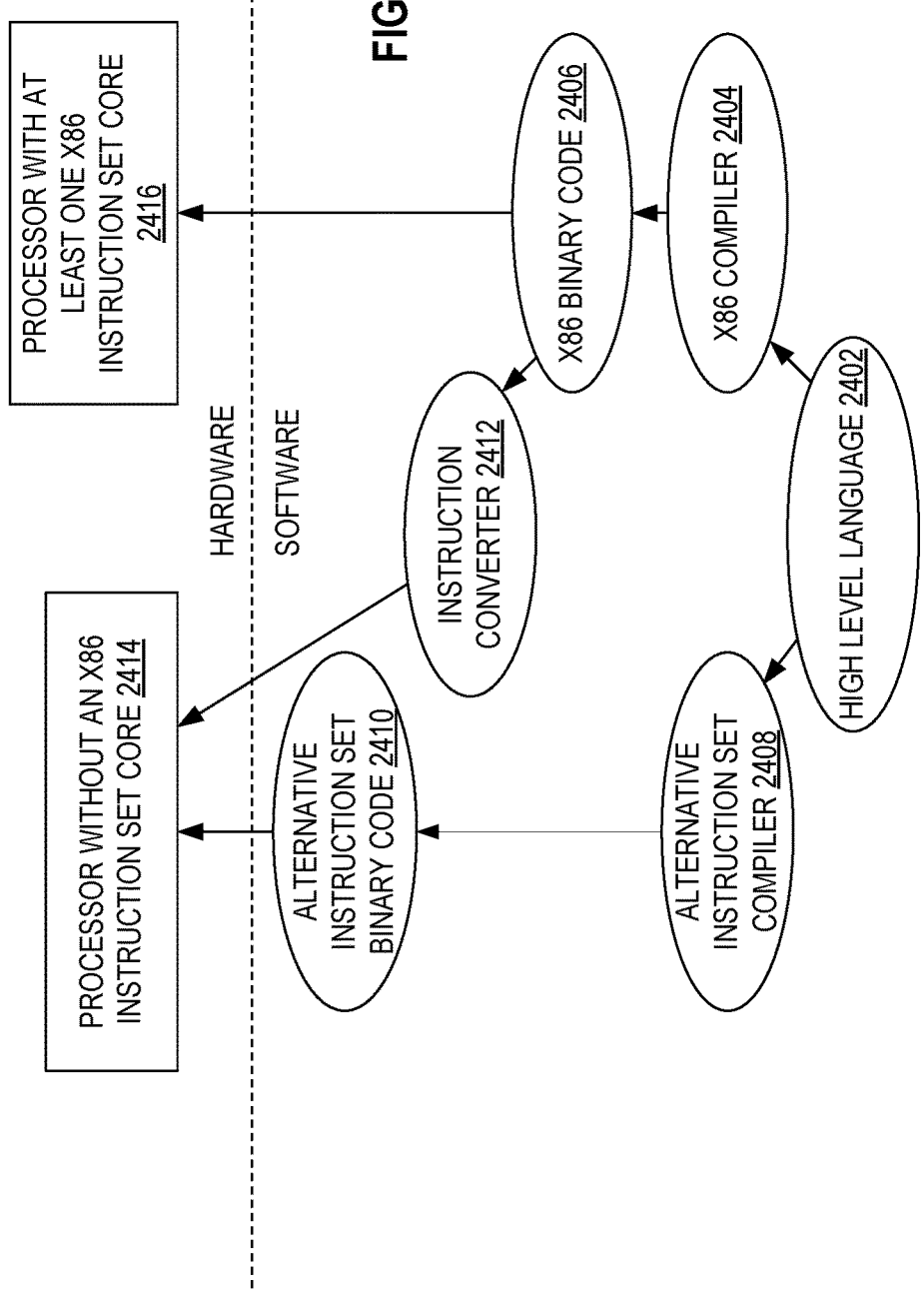
FIG. 24 is a block diagram contrasting the use of a software instruction converter to convert binary instructions in a source instruction set to binary instructions in a target instruction set according to embodiments of the invention.

FIG. 24 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2416. The processor with at least one x86 instruction set core 2416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 may be compiled using an alternative instruction set compiler 2408 to generate alternative instruction set binary code 2410 that may be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that may be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

EXAMPLES

Detailed below are examples of embodiments of apparatuses, systems, and methods discussed above.

Example 1

An apparatus comprising: instruction execution circuitry to execute one or more instructions; a register state cache coupled to the instruction execution circuitry, the register state cache to hold thread register state in a plurality of registers; and backing storage pointer storage to store a backing storage pointer, wherein the backing storage pointer is to reference a state backing storage area in external memory to store the thread register state stored in the register state cache.

Example 2

The apparatus of example 1, wherein the thread register state includes data and state information for the data.

Example 3

The apparatus of example 2, wherein the state information for the data is one of invalid, valid, and dirty.

Example 4

The apparatus of any of examples 1-3, wherein the plurality of registers of the register state cache comprises two-dimensional registers.

Example 5

The apparatus of any of examples 1-4, wherein the backing storage pointer and a size of the state backing storage area is set by an execution of an instruction to configure the register state cache by the instruction execution circuitry.

Example 6

The apparatus of example 5, wherein the execution of an instruction to configure the register state cache by the instruction execution circuitry comprises retrieving a configuration from memory and configuring usage of the register state cache, and the size of the state backing storage area is a field in the configuration.

Example 7

The apparatus of example 5, wherein the execution of an instruction to configure the register state cache by the instruction execution circuitry comprises retrieving a configuration from memory and configuring usage of the register state cache, and the size of the state backing storage area is stored in a palette table associated with the configuration.

Example 8

The apparatus of any of examples 1-7, wherein a size of the state backing storage area is a cumulative size of each of configured two-dimensional registers in the register state cache.

Example 9

A method comprising: configuring usage and initializing a state backing storage area; executing at least one instruction using a register state cache, the register state cache to hold thread register state in a plurality of registers; and saving the thread register state from the register state cache in the state backing storage area.

Example 10

The method of example 9, wherein the configuring usage and initializing a state backing storage area is performed by an execution of an instruction to configure the register state cache.

Example 11

The method of any of examples 9-10, wherein configuring the state backing storage area comprises storing a reference to the state backing storage area.

Example 12

The method of example 11, wherein the reference is stored in a machine specific register.

Example 13

The method of example 11, wherein the reference is stored in as a part of a software thread state.

Example 14

The method of any of examples 9-13, wherein the plurality of registers of the register state cache comprises two-dimensional registers.

Example 15

A system comprising: memory; and a processor including:
instruction execution circuitry to execute one or more instructions, a register state cache coupled to the instruction execution circuitry, the register state cache to hold thread register state in a plurality of registers, and backing storage pointer storage to store a backing storage pointer, wherein the backing storage pointer is to reference a state backing storage area in the memory to store the thread register state stored in the register state cache.

Example 16

The system of example 15, wherein the thread register state includes data and state information for the data.

Example 17

The system of example 16, wherein the state information for the data is one of invalid, valid, and dirty.

Example 18

The system of any of examples 15-17, wherein the plurality of registers of the register state cache comprises two-dimensional registers.

Example 19

The system of any of examples 15-18, wherein the backing storage pointer and a size of the state backing storage area is set by an execution of an instruction to configure the register state cache by the instruction execution circuitry.

Example 20

The system of example 19, wherein the execution of an instruction to configure the register state cache by the instruction execution circuitry comprises retrieving a configuration from memory and configuring usage of the register state cache, and the size of the state backing storage area is a field in the configuration.

Example 21

The system of example 19, wherein the execution of an instruction to configure the register state cache by the instruction execution circuitry comprises retrieving a configuration from memory and configuring usage of the register state cache, and the size of the state backing storage area is stored in a palette table associated with the configuration.

We claim:

1. An apparatus comprising:
instruction execution circuitry to execute one or more instructions;
a register state cache coupled to the instruction execution circuitry, the register state cache to hold thread register state in a plurality of registers, wherein the plurality of registers of the register state cache comprises two-dimensional registers; and
backing storage pointer storage to store a backing storage pointer, wherein the backing storage pointer is to reference a state backing storage area in external memory to store the thread register state stored in the register state cache, wherein the backing storage pointer and a size of the state backing storage area is set by an execution of an instruction to configure the register state cache by the instruction execution circuitry, and the execution of an instruction to configure the register state cache by the instruction execution circuitry comprises retrieving a configuration from memory and configuring usage of the register state cache, and the size of the state backing storage area is to be stored in one of a field in of the configuration and a palette table associated with the configuration.

2. The apparatus of claim 1, wherein the thread register state includes data and state information for the data.

3. The apparatus of claim 2, wherein the state information for the data is one of invalid, valid, and dirty.

4. The apparatus of claim 1, wherein a two-dimensional register is an overlay of two physical registers.

5. The apparatus of claim 1, wherein a size of the state backing storage area is a cumulative size of each of configured two-dimensional registers in the register state cache.

6. A system comprising:
memory; and
a processor including:
instruction execution circuitry to execute one or more instructions,
a register state cache coupled to the instruction execution circuitry, the register state cache to hold thread register state in a plurality of registers, wherein the plurality of registers of the register state cache comprises two-dimensional registers, and
backing storage pointer storage to store a backing storage pointer, wherein the backing storage pointer is to reference a state backing storage area in the memory to store the thread register state stored in the register state cache, wherein the backing storage pointer and a size of the state backing storage area is set by an execution of an instruction to configure the register state cache by the instruction execution circuitry, and the execution of an instruction to configure the register state cache by the instruction execution circuitry comprises retrieving a configuration from memory and configuring usage of the register state cache, and the size of the state backing storage area is to be stored in one of a field in of the configuration and a palette table associated with the configuration.

7. The system of claim 6, wherein the thread register state includes data and state information for the data.

8. The system of claim 7, wherein the state information for the data is one of invalid, valid, and dirty.

9. The system of claim 6, wherein a two-dimensional register is an overlay of two physical registers.

* * * * *